(12) United States Patent
Lehman

(10) Patent No.: US 6,810,301 B2
(45) Date of Patent: Oct. 26, 2004

(54) METHOD OF RECYCLING BATCHES OF MIXED COLOR CULLET INTO AMBER, GREEN, OR FLINT GLASS WITH SELECTED PROPERTIES

(75) Inventor: Richard L. Lehman, Princeton, NJ (US)

(73) Assignee: Culchrome LLC, Charlotte, NC (US)

( * ) Notice: Subject to any disclaimer, the term of this patent is extended or adjusted under 35 U.S.C. 154(b) by 0 days.

(21) Appl. No.: 10/682,450

(22) Filed: Oct. 9, 2003

(65) Prior Publication Data

US 2004/0078110 A1 Apr. 22, 2004

Related U.S. Application Data

(60) Continuation of application No. 09/455,644, filed on Dec. 7, 1999, which is a division of application No. 09/057,763, filed on Apr. 9, 1998, now Pat. No. 6,230,521.

(51) Int. Cl.[7] .......................... G06F 19/00; C03C 4/00; C03C 6/00
(52) U.S. Cl. ........................ 700/157; 700/90; 700/117; 428/34.1; 501/27
(58) Field of Search ......................... 700/90, 117, 157; 428/34.1, 34.4; 65/27, 28, 134.1, 135.9, 136.1; 501/27, 32

(56) References Cited

U.S. PATENT DOCUMENTS

| 576,312 | A | 2/1897 | Hirsch .......................... 201/27 |
| 2,292,675 | A | 8/1942 | Von Wranau et al. .......... 15/54 |
| 2,955,948 | A | 10/1960 | Silverman ..................... 106/52 |
| 3,003,886 | A | 10/1961 | Pither .......................... 65/134 |
| 3,325,298 | A | 6/1967 | Brown ........................ 65/134 |
| 3,482,955 | A | 12/1969 | Monks ........................ 65/134 |
| 4,077,871 | A | 3/1978 | Kumar et al. ................. 209/4 |
| 4,312,953 | A | 1/1982 | Mills et al. ................... 501/71 |
| 4,418,014 | A | 11/1983 | Daniek ........................ 260/125 |
| 4,457,772 | A | 7/1984 | Haynes et al. ................ 65/160 |
| 4,932,035 | A | 6/1990 | Pieper .......................... 373/32 |
| 5,588,978 | A | * 12/1996 | Argent et al. ................ 65/29.1 |
| 5,712,797 | A | 1/1998 | Descales et al. ............ 364/499 |
| 5,718,737 | A | 2/1998 | Mosch .......................... 65/30 |

OTHER PUBLICATIONS

"Use of Selenium for Decolorizing Glass", *The Glass Industry*, Sep. 1935, 283–287.

Kirk–Othmer, "Concise Encyclopedia of Chemical Technology", John Wiley & Sons, Inc., 1985, 560–565.

McCreery, P., "Coors' Sorted–Only Policy Affecting Glass Collections in West", *Waste Age's Recycling Times*, Jan. 24, 1995, 16 pages.

Scholes, S.R., Ph.D., "Modern Glass Practice", CBI Publishing Co., Inc., 1975.

Springer–Verlag, "Glass Furnaces", 1984, 7–9, 167–169.

E. Joseph Duckett, "The Influence of Color Mixture on the Use of Glass Cullet Recovered from Municipal Solid Waste", 1979.

(List continued on next page.)

*Primary Examiner*—Jayprakash N. Gandhi
(74) *Attorney, Agent, or Firm*—Woodcock Washburn LLP

(57) ABSTRACT

An automated method for recycling mixed colored cullet glass (i.e., broken pieces of glass of mixed colors and types) into new glass products. A computer controlled process identifies the virgin glass raw materials, the desired target glass properties, the composition of a batch of mixed colored cullet, and the quantity of cullet to be used in the glass melt, and the computer controlled process automatically determines the proper amounts of raw materials to add to the batch of mixed colored cullet so that recycled glass is produced having the desired coloring oxides, redox agents, and glass structural oxides in the proper proportion. The recycled glass is then used to make glass products such as beer bottles.

17 Claims, 40 Drawing Sheets

OTHER PUBLICATIONS

Morey, "Processes and Products of Glass Recovery from Municipal Trash", *Chemical Properties and Melting Experience*, Collected Papers, Nov. 11 and 12, 1976, Department of Ceramic Engineering, The Ohio State University, Columbus Ohio.

"New Dimensions in Cullet Processing", *Glass Production Technology International*, 1995, 39–41.

Cummings, J.P., "Glass and Non–Ferrous Metal Recovery Subsystem", *Proceedings of the 5th Mineral Waste Utilization Symposium*, 1976, 175–183.

Morey, B. et al., "A Review of Resource Recovery Technology", *In the World Mining and Metals Technology*, 1976, 2(55), 877–909.

Booker, Morey, "Glass Recovery from Municipal Trash by Froth Flotation", *Proceedings of the 3rd Mineral Waste Utilization Symposium*, 1972, 311–321.

Morey, B., "Inorganic Resource Recovery and Solid Fuel Preparation from Municipal Trash", *Proceedings of the 4th Mineral Waste Utilization Symposium*, 1974, 85–94.

Samtur, H.R., "Glass Recycling and Reuse", *IES Report 17*, 1974, 1–100.

Seeley, C.E., "Glass in Solid Waste Recovery Systems", *Resource Recovery and Utilization*, 1974, 114–121.

Stewart, G.M., "How Foreign Cullet Usage Affects Container Production", *Glass Industry*, 1985, 14–23.

Stirling, H., The Recovery of Waste Glass Cullet for Recycling Purposes by Means of Electrooptical Sorters, *Conservation & Recycling*, 1976, 1, 209–219.

* cited by examiner

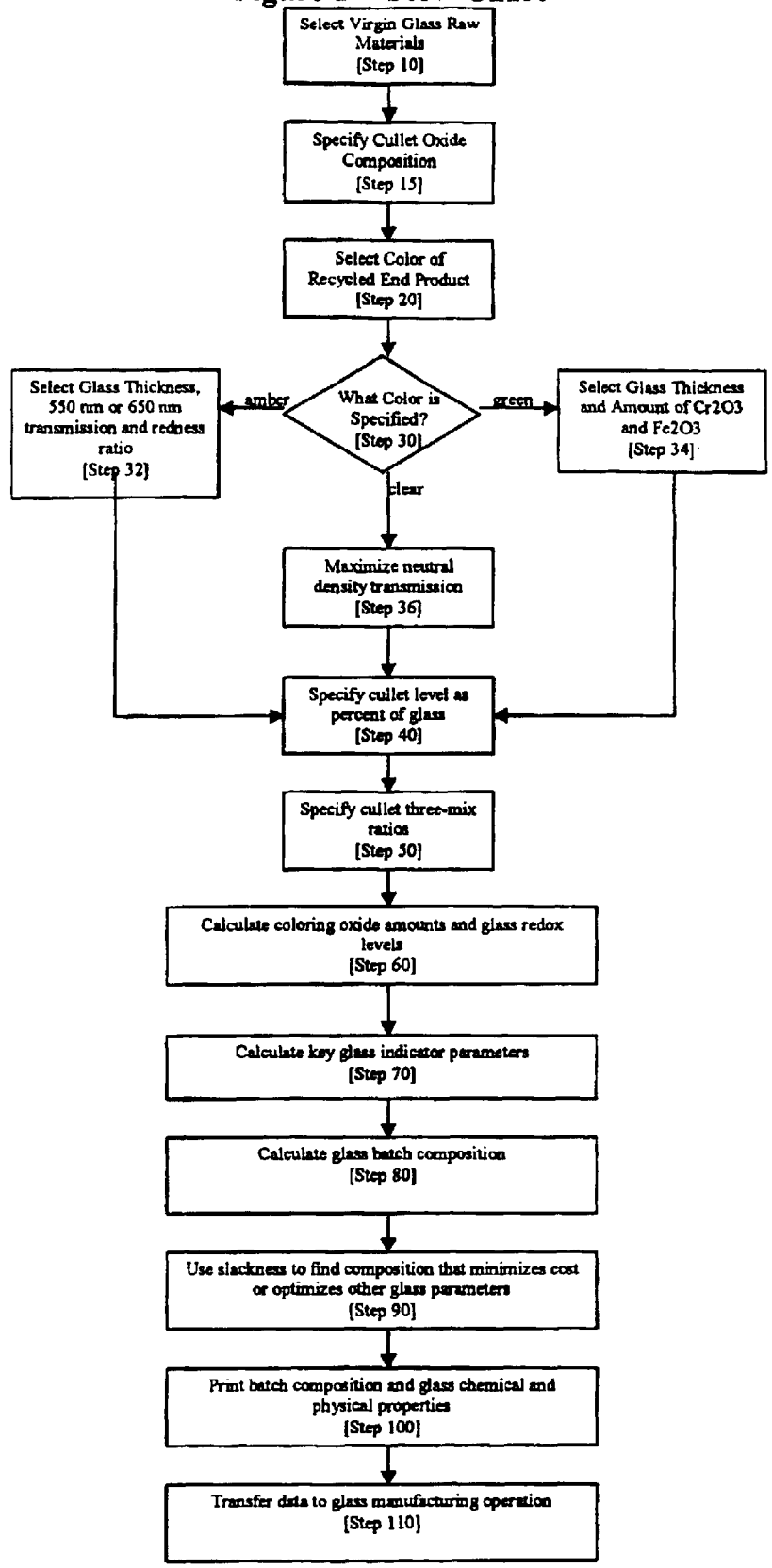

Figure 2(a)

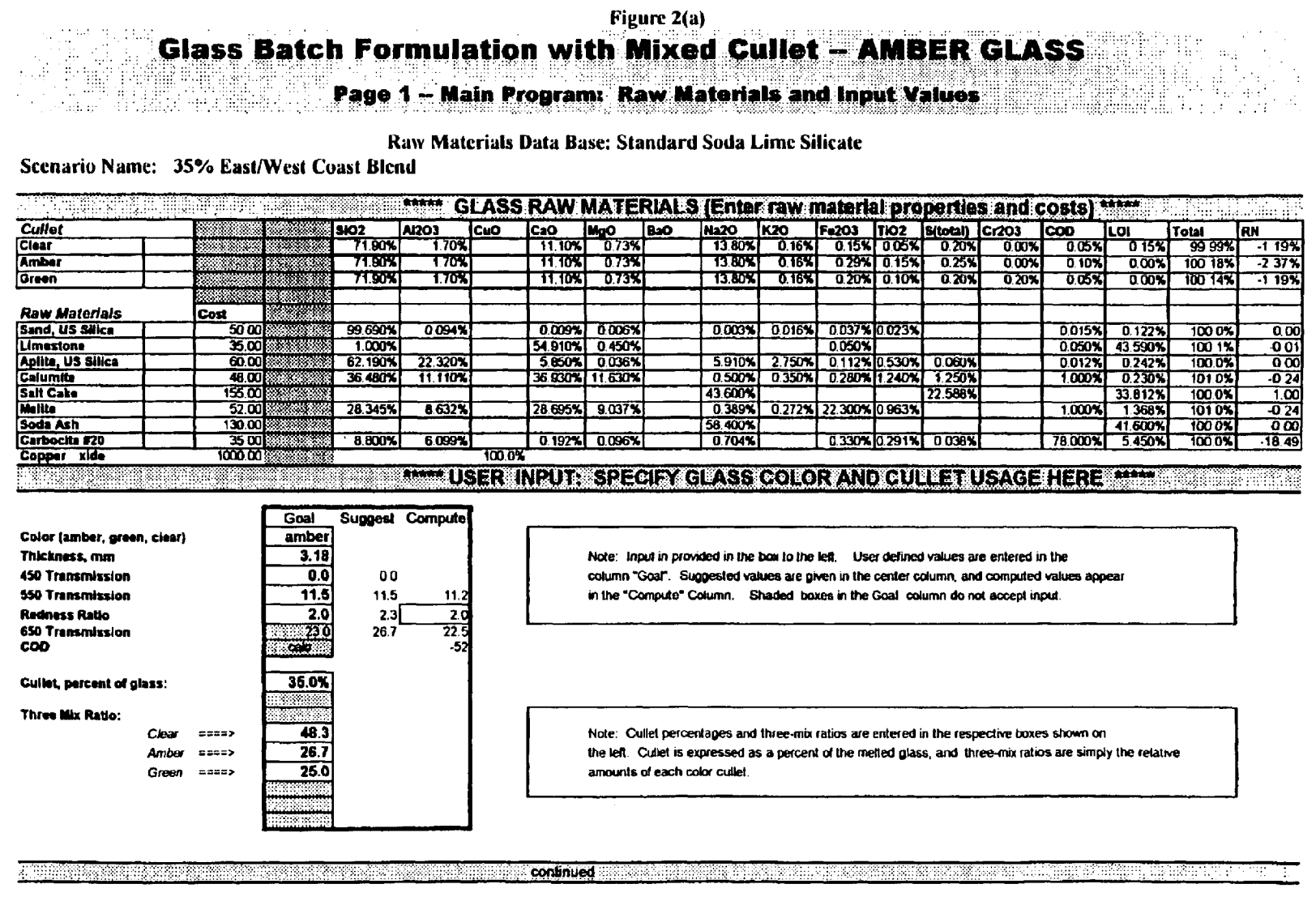

Glass Batch Formulation with Mixed Cullet -- AMBER GLASS

Page 1 -- Main Program: Raw Materials and Input Values

Raw Materials Data Base: Standard Soda Lime Silicate

Scenario Name: 35% East/West Coast Blend

*USER INPUT: SPECIFY GLASS COLOR AND CULLET USAGE HERE* continued

Figure 2(b)

Glass Batch Formulation with Mixed Cullet -- AMBER GLASS
Page 2 -- Main Program: Calculated Values

*** GLASS BATCH FORMULA (computed batch weights appear in Batch Column) ***

| Cullet | Wt. Lbs | Percent | SiO2 | Al2O3 | CuO | CaO | MgO | BaO | Na2O | K2O | Fe2O3 | TiO2 | S(total) | Cr2O3 | COD | LOI | Total | RN |
|---|---|---|---|---|---|---|---|---|---|---|---|---|---|---|---|---|---|---|
| TOTAL | 700 | | | | | | | | | | | | | | | | | |
| Clear | 338 | 16.91% | 243.09 | 5.75 | 0.00 | 37.53 | 2.47 | 0.00 | 46.66 | 0.54 | 0.51 | 0.17 | 0.68 | 0.00 | 0.17 | 0.51 | 338.07 | -4.01 |
| Amber | 187 | 9.35% | 134.38 | 3.18 | 0.00 | 20.75 | 1.36 | 0.00 | 25.79 | 0.30 | 0.55 | 0.28 | 0.47 | 0.00 | 0.19 | 0.00 | 187.24 | -4.43 |
| Green | 175 | 8.75% | 125.83 | 2.98 | 0.00 | 19.43 | 1.28 | 0.00 | 24.15 | 0.28 | 0.35 | 0.18 | 0.35 | 0.35 | 0.09 | 0.00 | 175.25 | -2.07 |

| Raw Materials | Batch Weight | Cost | SiO2 | Al2O3 | CuO | CaO | MgO | BaO | Na2O | K2O | Fe2O3 | TiO2 | S(total) | Cr2O3 | COD | LOI | Total | RN |
|---|---|---|---|---|---|---|---|---|---|---|---|---|---|---|---|---|---|---|
| Sand, US Silica | 855.2 | 21.38 | 852.55 | 0.80 | 0.00 | 0.08 | 0.05 | 0.00 | 0.03 | 0.14 | 0.31 | 0.20 | 0.00 | 0.00 | 0.13 | 1.04 | 855.33 | -3.04 |
| Limestone | 146.1 | 2.56 | 1.46 | 0.00 | 0.00 | 80.22 | 0.66 | 0.00 | 0.00 | 0.00 | 0.07 | 0.00 | 0.00 | 0.00 | 0.07 | 63.68 | 146.17 | -1.73 |
| Aplite, US Silica | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Columite | 179.9 | 4.32 | 65.83 | 19.99 | 0.00 | 66.44 | 20.82 | 0.00 | 0.90 | 0.63 | 0.50 | 2.23 | 2.75 | 0.00 | 1.80 | 0.41 | 181.70 | -42.64 |
| Salt Cake | 18.2 | 1.41 | 0.00 | 0.00 | 0.00 | 0.00 | 0.00 | 0.00 | 7.94 | 0.00 | 0.00 | 0.00 | 4.11 | 0.00 | 0.00 | 6.15 | 18.20 | 18.20 |
| Melite - 40 | 7.63 | 0.20 | 2.16 | 0.66 | 0.00 | 2.19 | 0.69 | 0.00 | 0.03 | 0.02 | 1.70 | 0.07 | 0.00 | 0.00 | 0.08 | 0.10 | 7.71 | -1.81 |
| Soda Ash, FMC | 282.5 | 18.36 | 0.00 | 0.00 | 0.00 | 0.00 | 0.00 | 0.00 | 164.98 | 0.00 | 0.00 | 0.00 | 0.00 | 0.00 | 0.00 | 117.52 | 282.50 | 0.00 |
| Carbocite #20 | 0.54 | 0.01 | 0.05 | 0.03 | 0.00 | 0.00 | 0.00 | 0.00 | 0.00 | 0.00 | 0.00 | 0.00 | 0.00 | 0.00 | 0.42 | 0.03 | 0.54 | -9.98 |
| Copper Oxide | 2.543E-01 | 0.13 | | | 0.25 | | | | | | | | | | | | | | |
| T TALS | 1490 | 48.36 | 1425.15 | 33.38 | 0.25 | 226.63 | 27.43 | 0.00 | 270.48 | 1.91 | 4.00 | 3.12 | 7.85 | 0.35 | 2.94 | 189.46 | 2192.95 | -51.51 |

*** GLASS OXIDE FORMULA (Enter target glass composition) ***

| Glass | Total | Percent | Glass=100 |
|---|---|---|---|
| Glass | 2001 | 91.2% | 100.00 |
| LOI | 192.40 | 8.8% | 9.62 |
| Total | 2192.95 | 100.0% | 109.62 |

| | SiO2 | Al2O3 | CuO | CaO | MgO | BaO | Na2O | K2O | Fe2O3 | TiO2 | S(total) | Cr2O3 | COD | RN |
|---|---|---|---|---|---|---|---|---|---|---|---|---|---|---|
| Glass Oxides | 71.90% | 1.70% | 0.01% | 11.10% | 1.37% | 0.00% | 13.80% | 0.16% | 0.200% | 0.16% | 0.40% | 0.017% | 0.15% | |
| Target Glass (default given) | 71.90% | 1.70% | 0.01% | 11.10% | 1.37% | 0.00% | 13.80% | 0.16% | 0.200% | 0.16% | 0.40% | 0.017% | 0.15% | |
| Calculated Oxide Composition | 71.24% | 1.67% | 0.01% | 11.33% | 1.37% | 0.00% | 13.52% | 0.10% | 0.20% | 0.16% | 0.39% | 0.017% | 0.15% | -51.51 |

*** End of Main ***

Figure 2(c)
Glass Batch Formulations Using 3-Mix Cullet
Example Batches and Resultant Glass Properties

| Melt Identification | | | | | | |
|---|---|---|---|---|---|---|
| Scenario Name: 35% East/West Coast Blend | | | | | Cullet Color Percents | |
| | | | | | 48.3 Clear | |
| Cullet Percentage | 35.0% | | | | 26.7 Amber | |
| | | | | | 25.0 Green | |

Batch Formulation — Oxide Composition

| | Cullet | Total Batch | | | | |
|---|---|---|---|---|---|---|
| | weight, lbs. | Weight, lbs. | Weight, g | | Oxide | Wt. Pct. |
| Cullet | (by color) | (2000 lbs glass) | (1000 g glass) | Percent | | |
| Clear | 338 | | 169.05 | | SiO2 | 71.2% |
| Amber | 187 | | 93.45 | | Al2O3 | 1.7% |
| Green | 175 | | 87.5 | | CaO | 11.3% |
| TOTAL | | 700 | 350 | 31.92% | MgO | 1.4% |
| | | | | | Na2O | 13.5% |
| *Virgin Raw Materials* | | | | | K2O | 0.1% |
| Sand, US Silica | | 855.2 | 427.6 | 39.00% | Fe2O3 | 0.200% |
| Limestone | | 146.1 | 73.1 | 6.66% | TiO2 | 0.156% |
| Aplite, US Silica | | 0.0 | 0.0 | 0.00% | S(total) | 0.393% |
| Calumite | | 179.9 | 90.0 | 8.20% | Cr2O3 | 0.017% |
| Salt Cake | | 18.2 | 9.1 | 0.83% | | |
| Melite - 40 | | 7.6 | 3.8 | 0.35% | Total | 100.0% |
| Soda Ash, FMC | | 282.5 | 141.3 | 12.88% | | |
| Coal, Carbocite #20 | | 0.54 | 0.27 | 0.02% | | |
| Copper Oxide | | 2.54E-01 | 1.27E-01 | 0.012% | | |
| TOTALS | | 2190.3 | 1095.2 | 99.88% | | |
| | | | | | | |
| After Melting: | | | | | | |
| Glass | | 2000.6 | 1000.3 | | | |
| LOI | | 192.4 | 96.2 | | | |
| Total | | 2193.0 | 1096.5 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -51.51 |

Figure 3
Visible Transmission Data for Selected Amber, Green and Clear Glasses

| ID. # ==> | 1 | 2 | 3 | 4 | 5 | 6 | 7 | 8 | 9 | 10 |
|---|---|---|---|---|---|---|---|---|---|---|
| Type | Amber | Amber | Amber | Amber | Amber | Amber | Green | Clear | Green | Green |
| Brand | Stout | S. Adams | Paulaner | Budweiser | Miller | Coors | Becks | | Heineken | Gallo |
| Wavelength | | | | | | | | | | |
| 400 | 0.00 | 0.00 | 0.06 | 0.00 | 0.00 | 0.00 | 58.08 | 69.71 | 57.76 | 59.65 |
| 450 | 0.01 | 0.00 | 0.29 | 0.00 | 0.01 | 0.01 | 19.34 | 70.04 | 22.36 | 21.71 |
| 500 | 1.01 | 0.89 | 4.66 | 0.79 | 1.07 | 0.86 | 43.21 | 71.28 | 45.38 | 40.94 |
| 550 | 9.81 | 10.32 | 20.35 | 9.84 | 11.92 | 9.94 | 67.45 | 70.97 | 67.21 | 56.00 |
| 600 | 17.92 | 21.02 | 28.83 | 21.44 | 22.79 | 21.49 | 36.89 | 71.85 | 40.10 | 41.19 |
| 650 | 18.88 | 22.69 | 27.96 | 25.02 | 24.64 | 24.39 | 21.01 | 72.08 | 25.16 | 29.15 |
| 700 | 20.87 | 23.40 | 26.57 | 27.79 | 27.44 | 25.14 | 26.84 | 71.90 | 31.88 | 38.15 |
| | | | | | | | | | | |
| Red Ratio | 1.92 | 2.20 | 1.37 | 2.54 | 2.07 | 2.45 | 0.31 | 1.02 | 0.37 | 0.52 |

Figure 4
Cullet Composition Model

Data and Calculated Mixes

| | G | A | Clear | Amber | Green |
|---|---|---|---|---|---|
| Approximate USA Production (from industry sources)→ | | | 58.0% | 32.0% | 10.0% |
| USA production, plus imported glass of G% green A% amber | 10.0% | 0.0% | 52.7% | 29.1% | 18.2% |
| | 15.0% | 0.0% | 50.4% | 27.8% | 21.7% |
| | 20.0% | 0.0% | 48.3% | 26.7% | 25.0% |
| | 25.0% | 0.0% | 46.4% | 25.6% | 28.0% |
| | 10.0% | 5.0% | 50.4% | 32.2% | 17.4% |
| | 15.0% | 5.0% | 48.3% | 30.8% | 20.8% |
| | 20.0% | 5.0% | 46.4% | 29.6% | 24.0% |
| | 25.0% | 5.0% | 44.6% | 28.5% | 26.9% |
| | 10.0% | 10.0% | 48.3% | 35.0% | 16.7% |
| | 15.0% | 10.0% | 46.4% | 33.6% | 20.0% |
| | 20.0% | 10.0% | 44.6% | 32.3% | 23.1% |
| | 25.0% | 10.0% | 43.0% | 31.1% | 25.9% |

Scenarios for Batch Calculations

| | Clear | Amber | Green |
|---|---|---|---|
| USA Production | 58.0% | 32.0% | 10.0% |
| East/West Coast Mix, (USA plus 20% green import) | 48.3% | 26.7% | 25.0% |
| One third clear removed from USA Production | 47.9% | 39.7% | 12.4% |
| Two-thirds clear removed from USA Production | 31.5% | 52.2% | 16.3% |
| Trend to Amber: (USA GPI with 30% more amber) | 52.9% | 38.0% | 9.1% |
| Beer Belt Blend (heavy amber, few imports) | 55.0% | 40.0% | 5.0% |
| Min | 31.5% | 26.7% | 5.0% |
| Max | 58.0% | 52.2% | 25.0% |

Figure 5
Extinction Coefficient Summary

| ID, # | 1 | 2 | 3 | 4 | 5 | 6 | 7 | 8 | 9 | 10 |
|---|---|---|---|---|---|---|---|---|---|---|
| Type | Amber | Amber | Amber | Amber | Amber | Amber | Green | Clear | Green | Green |
| Brand | Stout | S. Adams | Paulaner | Budweiser | Miller | Coors | Becks | Heineken | Heineken | Gallo |
| Wavelength | | | | | | | | | | |
| 400 | 3.536 | 3.305 | 2.286 | 3.817 | 4.442 | 4.176 | 0.143 | 0.086 | 0.145 | 0.135 |
| 450 | 2.962 | 3.344 | 1.815 | 3.111 | 2.905 | 3.047 | 0.489 | 0.084 | 0.443 | 0.453 |
| 500 | 1.418 | 1.459 | 0.937 | 1.495 | 1.399 | 1.467 | 0.236 | 0.079 | 0.221 | 0.253 |
| 550 | 0.703 | 0.687 | 0.473 | 0.702 | 0.641 | 0.698 | 0.096 | 0.080 | 0.097 | 0.155 |
| 600 | 0.513 | 0.463 | 0.364 | 0.457 | 0.438 | 0.456 | 0.286 | 0.076 | 0.260 | 0.251 |
| 650 | 0.497 | 0.439 | 0.373 | 0.408 | 0.413 | 0.416 | 0.463 | 0.075 | 0.406 | 0.360 |
| 700 | 0.465 | 0.429 | 0.389 | 0.375 | 0.379 | 0.407 | 0.386 | 0.076 | 0.332 | 0.276 |

Average Extinction Coefficients for Major Amber and Green manufacturers

| | BMC Avg | BH Avg | Clear |
|---|---|---|---|
| 450 | 3.021 | 0.466 | 0.084 |
| 550 | 0.680 | 0.097 | 0.080 |
| 600 | 0.450 | 0.393 | 0.273 |
| 650 | 0.412 | 0.435 | 0.075 |

Average 3.18 transmission for major amber and green manufacturers

| | BMC Avg | BH Avg | Clear |
|---|---|---|---|
| 550 | 10.525 | 67.333 | 70.971 |
| 600 | 21.897 | 26.238 | 38.475 |
| 650 | 24.683 | 22.992 | 72.080 |

Figure 6(a)
Glass Batch Formulations Using 3-Mix Cullet
Example Batches and Resultant Glass Properties

Melt Identification

| Scenario Name: Amber w/35% Three-Mix, East/West Coast Blend | | Cullet Color Percents |
|---|---|---|
| Cullet Percentage | 50.0% | 48.3 Clear<br>26.7 Amber<br>25.0 Green |

Batch Formulation                                               Oxide Composition

| | Cullet | Total Batch | | | | |
|---|---|---|---|---|---|---|
| *Cullet* | weight, lbs.<br>(by color) | Weight, lbs.<br>(2000 lbs glass) | Weight, g<br>(1000 g glass) | Percent | Oxide | Wt. Pct. |
| Clear | 483 | | 241.5 | | SiO2 | 71.7% |
| Amber | 267 | | 133.5 | | Al2O3 | 1.7% |
| Green | 250 | | 125 | | CaO | 10.9% |
| TOTAL | | 1000 | 500 | 46.76% | MgO | 1.3% |
| | | | | | Na2O | 13.5% |
| *Virgin Raw Materials* | | | | | K2O | 0.1% |
| Sand, US Silica | | 660.1 | 330.0 | 30.86% | Fe2O3 | 0.200% |
| Limestone | | 90.9 | 45.5 | 4.25% | TiO2 | 0.147% |
| Aplite, US Silica | | 0.0 | 0.0 | 0.00% | S(total) | 0.392% |
| Calumite | | 148.7 | 74.4 | 6.96% | Cr2O3 | 0.025% |
| Salt Cake | | 17.0 | 8.5 | 0.80% | | |
| Melite - 40 | | 5.7 | 2.9 | 0.27% | Total | 100.0% |
| Soda Ash, FMC | | 212.8 | 106.4 | 9.95% | | |
| Coal, Carbocite #20 | | 0.61 | 0.3055 | 0.03% | | |
| Copper Oxide | | 3.295E-01 | 0.1647 | 0.015% | | |
| TOTALS | | 2136.2 | 1068.1 | 99.88% | | |
| | | | | | | |
| After Melting: | | | | | | |
| Glass | | 2000.0 | 1000.0 | | | |
| LOI | | 138.7 | 69.3 | | | |
| Total | | 2138.7 | 1069.3 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -49.32 |

Figure 6(b)
Glass Batch Formulations Using 3-Mix Cullet
Example Batches and Resultant Glass Properties

Melt Identification

| Scenario Name: East/West Coast Blend | | | | Cullet Color Percents | |
|---|---|---|---|---|---|
| | | | | 48.3 Clear | |
| Cullet Percentage | 75.0% | | | 26.7 Amber | |
| | | | | 25.0 Green | |

Batch Formulation                  Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | (2000 lbs glass) | (1000 g glass) | Percent | | |
| Clear | 725 | | 362.25 | | SiO2 | 71.9% |
| Amber | 401 | | 200.25 | | Al2O3 | 1.7% |
| Green | 375 | | 187.5 | | CaO | 10.9% |
| TOTAL | | 1500 | 750 | 72.57% | MgO | 1.0% |
| | | | | | Na2O | 13.5% |
| *Virgin Raw Materials* | | | | | K2O | 0.1% |
| Sand, US Silica | | 331.7 | 165.9 | 16.05% | Fe2O3 | 0.200% |
| Limestone | | 39.6 | 19.8 | 1.92% | TiO2 | 0.120% |
| Aplite, US Silica | | 0.0 | 0.0 | 0.00% | S(total) | 0.392% |
| Calumite | | 77.1 | 38.5 | 3.73% | Cr2O3 | 0.038% |
| Salt Cake | | 16.3 | 8.1 | 0.79% | | |
| Melite - 40 | | 2.8 | 1.4 | 0.13% | Total | 100.0% |
| Soda Ash, FMC | | 95.8 | 47.9 | 4.64% | | |
| Coal, Carbocite #20 | | 1.02 | 0.5113 | 0.05% | | |
| Copper Oxide | | 6.226E-01 | 0.3113 | 0.030% | | |
| TOTALS | | 2065.0 | 1032.5 | 99.90% | | |
| | | | | | | |
| After Melting: | | | | | | |
| Glass | | 2000.0 | 1000.0 | | | |
| LOI | | 67.0 | 33.5 | | | |
| Total | | 2067.0 | 1033.5 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -45.73 |

Figure 7(a)
Glass Batch Formulations Using 3-Mix Cullet
Example Batches and Resultant Glass Properties

Melt Identification

| Scenario Name: USA Production Three Mix | | | | Cullet Color Percents | |
|---|---|---|---|---|---|
| Cullet Percentage | 25.0% | | | 58.0 Clear | |
| | | | | 32.0 Amber | |
| | | | | 10.0 Green | |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| Cullet | (by color) | (2000 lbs glass) | (1000 g glass) | Percent | | |
| Clear | 290 | | 145 | | $SiO_2$ | 71.5% |
| Amber | 160 | | 80 | | $Al_2O_3$ | 1.7% |
| Green | 50 | | 25 | | CaO | 10.9% |
| TOTAL | | 500 | 250 | 22.62% | MgO | 1.5% |
| | | | | | $Na_2O$ | 13.5% |
| *Virgin Raw Materials* | | | | | $K_2O$ | 0.1% |
| Sand,-US Silica | | 988.6 | 494.3 | 44.72% | $Fe_2O_3$ | 0.200% |
| Limestone | | 142.2 | 71.1 | 6.43% | $TiO_2$ | 0.174% |
| Aplite, US Silica | | 0.0 | 0.0 | 0.00% | S(total) | 0.392% |
| Calumite | | 220.4 | 110.2 | 9.97% | $Cr_2O_3$ | 0.005% |
| Salt Cake | | 17.7 | 8.9 | 0.80% | | |
| Melite - 40 | | 8.7 | 4.4 | 0.39% | Total | 100.0% |
| Soda Ash, FMC | | 329.8 | 164.9 | 14.92% | | |
| Coal, Carbocite #20 | | 0.22 | 0.1082 | 0.01% | | |
| Copper Oxide | | 0.000 | 0.000 | 0.000 | | |
| TOTALS | | 2207.6 | 1103.8 | 99.87% | | |
| | | | | | | |
| After Melting: | | | | | | |
| Glass | | 2000.0 | 1000.0 | | | |
| LOI | | 210.4 | 105.2 | | | |
| Total | | 2210.4 | 1105.2 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.59 |

Figure 7(b)
Glass Batch Formulations Using 3-Mix Cullet
Example Batches and Resultant Glass Properties

Melt Identification

| Scenario Name: USA Production Three Mix | | Cullet Color Percents |
|---|---|---|
| | | 58.0 Clear |
| Cullet Percentage | 50.0% | 32.0 Amber |
| | | 10.0 Green |

Batch Formulation  Oxide Composition

| | Cullet | Total Batch | | | Oxide | Wt. Pct. |
|---|---|---|---|---|---|---|
| | weight, lbs. | Weight, lbs. | Weight, g | | | |
| Cullet | (by color) | (2000 lbs glass) | (1000 g glass) | Percent | | |
| Clear | 580 | | 290 | | SiO2 | 71.7% |
| Amber | 320 | | 160 | | Al2O3 | 1.7% |
| Green | 100 | | 50 | | CaO | 10.9% |
| TOTAL | | 1000 | 500 | 46.75% | MgO | 1.3% |
| | | | | | Na2O | 13.5% |
| *Virgin Raw Materials* | | | | | K2O | 0.1% |
| Sand, US Silica | | 660.7 | 330.4 | 30.89% | Fe2O3 | 0.200% |
| Limestone | | 91.0 | 45.5 | 4.25% | TiO2 | 0.146% |
| Aplite, US Silica | | 0.0 | 0.0 | 0.00% | S(total) | 0.392% |
| Calumite | | 148.7 | 74.3 | 6.95% | Cr2O3 | 0.010% |
| Salt Cake | | 16.9 | 8.5 | 0.79% | | |
| Melite - 40 | | 5.7 | 2.9 | 0.27% | Total | 100.0% |
| Soda Ash, FMC | | 212.9 | 106.4 | 9.95% | | |
| Coal, Carbocite #20 | | 0.79 | 0.3960 | 0.04% | | |
| Copper Oxide | | 0.000 | 0.000 | 0.000 | | |
| TOTALS | | 2136.7 | 1068.3 | 99.89% | | |
| | | | | | | |
| After Melting: | | | | | | |
| Glass | | 2000.0 | 1000.0 | | | |
| LOI | | 139.0 | 69.5 | | | |
| Total | | 2139.0 | 1069.5 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.38 |

Figure 7(c)
Glass Batch Formulations Using 3-Mix Cullet
Example Batches and Resultant Glass Properties

Melt Identification

| Scenario Name: USA Production Three Mix | | | | | Cullet Color Percents | |
|---|---|---|---|---|---|---|
| | | | | | 58.0 Clear | |
| Cullet Percentage | 75.0% | | | | 32.0 Amber | |
| | | | | | 10.0 Green | |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 870 | | 435 | | SiO2 | 72.0% |
| Amber | 480 | | 240 | | Al2O3 | 1.7% |
| Green | 150 | | 75 | | CaO | 10.9% |
| TOTAL | | 1500 | 750 | 72.55% | MgO | 1.0% |
| | | | | | Na2O | 13.5% |
| *Virgin Raw Materials* | | | | | K2O | 0.1% |
| Sand, US Silica | | 332.8 | 166.4 | 16.10% | Fe2O3 | 0.200% |
| Limestone | | 39.7 | 19.9 | 1.92% | TiO2 | 0.118% |
| Aplite, US Silica | | 0.0 | 0.0 | 0.00% | S(total) | 0.392% |
| Calumite | | 76.9 | 38.5 | 3.72% | Cr2O3 | 0.015% |
| Salt Cake | | 16.1 | 8.1 | 0.78% | | |
| Melite - 40 | | 2.8 | 1.4 | 0.13% | Total | 100.0% |
| Soda Ash, FMC | | 96.0 | 48.0 | 4.64% | | |
| Coal, Carbocite #20 | | 1.31 | 0.6567 | 0.06% | | |
| Copper Oxide | | 0.095 | 0.047 | 0.000 | | |
| TOTALS | | 2065.7 | 1032.8 | 99.91% | | |
| | | | | | | |
| After Melting: | | | | | | |
| Glass | | 2000.0 | 1000.0 | | | |
| LOI | | 67.6 | 33.8 | | | |
| Total | | 2067.6 | 1033.8 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -52.18 |

Figure 8(a)
Glass Batch Formulations Using 3-Mix Cullet
Example Batches and Resultant Glass Properties

Melt Identification

| Scenario Name: USA Production, 1/3 clear removed | | | | Cullet Color Percents |
|---|---|---|---|---|
| | | | | 47.9 Clear |
| Cullet Percentage | 25.0% | | | 39.7 Amber |
| | | | | 12.4 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 240 | | 119.75 | | $SiO_2$ | 71.5% |
| Amber | 199 | | 99.25 | | $Al_2O_3$ | 1.7% |
| Green | 62 | | 31 | | CaO | 10.9% |
| TOTAL | | 500 | 250 | 22.62% | MgO | 1.5% |
| | | | | | $Na_2O$ | 13.5% |
| *Virgin Raw Materials* | | | | | $K_2O$ | 0.1% |
| Sand, US Silica | | 988.5 | 494.3 | 44.72% | $Fe_2O_3$ | 0.200% |
| Limestone | | 142.2 | 71.1 | 6.43% | $TiO_2$ | 0.176% |
| Aplite, US Silica | | 0.0 | 0.0 | 0.00% | S(total) | 0.392% |
| Calumite | | 220.6 | 110.3 | 9.98% | $Cr_2O_3$ | 0.006% |
| Salt Cake | | 17.6 | 8.8 | 0.80% | | |
| Melite - 40 | | 8.4 | 4.2 | 0.38% | Total | 100.0% |
| Soda Ash, FMC | | 329.8 | 164.9 | 14.92% | | |
| Coal, Carbocite #20 | | 0.18 | 0.0921 | 0.01% | | |
| Copper Oxide | | 0.000 | 0.000 | 0.000 | | |
| TOTALS | | 2207.4 | 1103.7 | 99.87% | | |
| | | | | | | |
| After Melting: | | | | | | |
| Glass | | 2000.0 | 1000.0 | | | |
| LOI | | 210.3 | 105.2 | | | |
| Total | | 2210.3 | 1105.2 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.54 |

Figure 8(b)
Glass Batch Formulations Using 3-Mix Cullet
Example Batches and Resultant Glass Properties

| Melt Identification | | | | | |
|---|---|---|---|---|---|
| Scenario Name: USA Production, 1/3 clear removed | | | | Cullet Color Percents | |
| | | | | 47.9 Clear | |
| Cullet Percentage | 50.0% | | | 39.7 Amber | |
| | | | | 12.4 Green | |

| Batch Formulation | | | | Oxide Composition | |
|---|---|---|---|---|---|

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 479 | | 239.5 | | SiO2 | 71.7% |
| Amber | 397 | | 198.5 | | Al2O3 | 1.7% |
| Green | 124 | | 62 | | CaO | 10.9% |
| TOTAL | | 1000 | 500 | 46.75% | MgO | 1.3% |
| | | | | | Na2O | 13.5% |
| *Virgin Raw Materials* | | | | | K2O | 0.1% |
| Sand, US Silica | | 660.6 | 330.3 | 30.88% | Fe2O3 | 0.200% |
| Limestone | | 90.9 | 45.5 | 4.25% | TiO2 | 0.150% |
| Aplite, US Silica | | 0.0 | 0.0 | 0.00% | S(total) | 0.392% |
| Calumite | | 149.1 | 74.6 | 6.97% | Cr2O3 | 0.012% |
| Salt Cake | | 16.7 | 8.4 | 0.78% | | |
| Melite - 40 | | 5.2 | 2.6 | 0.24% | Total | 100.0% |
| Soda Ash, FMC | | 213.0 | 106.5 | 9.96% | | |
| Coal, Carbocite #20 | | 0.71 | 0.3543 | 0.03% | | |
| Copper Oxide | | 0.034 | 0.017 | 0.000 | | |
| TOTALS | | 2136.3 | 1068.1 | 99.88% | | |
| | | | | | | |
| After Melting: | | | | | | |
| Glass | | 2000.0 | 1000.0 | | | |
| LOI | | 138.8 | 69.4 | | | |
| Total | | 2138.8 | 1069.4 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -52.93 |

Figure 8(c)
Glass Batch Formulations Using 3-Mix Cullet
Example Batches and Resultant Glass Properties

Melt Identification

| Scenario Name: USA Production, 1/3 clear removed | | Cullet Color Percents |
|---|---|---|
| Cullet Percentage | 75.0% | 47.9 Clear<br>39.7 Amber<br>12.4 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 719 | | 359.25 | | SiO2 | 72.0% |
| Amber | 596 | | 297.75 | | Al2O3 | 1.7% |
| Green | 186 | | 93 | | CaO | 10.9% |
| TOTAL | | 1500 | 750 | 72.56% | MgO | 1.0% |
| | | | | | Na2O | 13.5% |
| *Virgin Raw Materials* | | | | | K2O | 0.1% |
| Sand, US Silica | | 332.5 | 166.2 | 16.08% | Fe2O3 | 0.200% |
| Limestone | | 39.7 | 19.8 | 1.92% | TiO2 | 0.124% |
| Aplite, US Silica | | 0.0 | 0.0 | 0.00% | S(total) | 0.392% |
| Calumite | | 77.7 | 38.8 | 3.76% | Cr2O3 | 0.019% |
| Salt Cake | | 15.8 | 7.9 | 0.76% | | |
| Melite - 40 | | 1.9 | 1.0 | 0.09% | Total | 100.0% |
| Soda Ash, FMC | | 96.2 | 48.1 | 4.65% | | |
| Coal, Carbocite #20 | | 1.17 | 0.5845 | 0.06% | | |
| Copper Oxide | | 0.179 | 0.090 | 0.000 | | |
| TOTALS | | 2065.1 | 1032.5 | 99.90% | | |
| | | | | | | |
| After Melting: | | | | | | |
| Glass | | 2000.0 | 1000.0 | | | |
| LOI | | 67.2 | 33.6 | | | |
| Total | | 2067.2 | 1033.6 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -51.15 |

Figure 9(a)
Glass Batch Formulations Using 3-Mix Cullet
Example Batches and Resultant Glass Properties

Melt Identification

| Scenario Name: USA Production, 2/3 clear removed | | Cullet Color Percents |
|---|---|---|
| Cullet Percentage 25.0% | | 31.5 Clear<br>52.2 Amber<br>16.3 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 158 | | 78.75 | | SiO2 | 71.5% |
| Amber | 261 | | 130.5 | | Al2O3 | 1.7% |
| Green | 82 | | 40.75 | | CaO | 10.9% |
| TOTAL | | 500 | 250 | 22.62% | MgO | 1.5% |
| | | | | | Na2O | 13.5% |
| *Virgin Raw Materials* | | | | | K2O | 0.1% |
| Sand, US Silica | | 988.4 | 494.2 | 44.72% | Fe2O3 | 0.200% |
| Limestone | | 142.2 | 71.1 | 6.43% | TiO2 | 0.180% |
| Aplite, US Silica | | 0.0 | 0.0 | 0.00% | S(total) | 0.392% |
| Calumite | | 221.0 | 110.5 | 10.00% | Cr2O3 | 0.008% |
| Salt Cake | | 17.5 | 8.7 | 0.79% | | |
| Melite - 40 | | 8.0 | 4.0 | 0.36% | Total | 100.0% |
| Soda Ash, FMC | | 330.0 | 165.0 | 14.93% | | |
| Coal, Carbocite #20 | | 0.13 | 0.0661 | 0.01% | | |
| Copper Oxide | | 0.000 | 0.000 | 0.000 | | |
| TOTALS | | 2207.1 | 1103.6 | 99.86% | | |
| | | | | | | |
| After Melting: | | | | | | |
| Glass | | 2000.0 | 1000.0 | | | |
| LOI | | 210.2 | 105.1 | | | |
| Total | | 2210.2 | 1105.1 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.46 |

Figure 9(b)
Glass Batch Formulations Using 3-Mix Cullet
Example Batches and Resultant Glass Properties

Melt Identification

| Scenario Name: USA Production, 2/3 clear removed | Cullet Color Percents |
| --- | --- |
| | 31.5 Clear |
| Cullet Percentage  50.0% | 52.2 Amber |
| | 16.3 Green |

Batch Formulation      Oxide Composition

| | Cullet | Total Batch | | | | |
| --- | --- | --- | --- | --- | --- | --- |
| | weight, lbs. | Weight, lbs. | Weight, g | | Oxide | Wt. Pct. |
| *Cullet* | (by color) | 2000 lbs glass | 1000 g glass | Percent | | |
| Clear | 315 | | 157.5 | | SiO2 | 71.8% |
| Amber | 522 | | 261 | | Al2O3 | 1.7% |
| Green | 163 | | 81.5 | | CaO | 10.9% |
| TOTAL | | 1000 | 500 | 46.68% | MgO | 1.2% |
| | | | | | Na2O | 13.5% |
| *Virgin Raw Materials* | | | | | K2O | 0.1% |
| Sand, US Silica | | 667.5 | 333.8 | 31.16% | Fe2O3 | 0.200% |
| Limestone | | 99.1 | 49.5 | 4.63% | TiO2 | 0.150% |
| Aplite, US Silica | | 0.0 | 0.0 | 0.00% | S(total) | 0.392% |
| Calumite | | 137.6 | 68.8 | 6.42% | Cr2O3 | 0.016% |
| Salt Cake | | 17.1 | 8.5 | 0.80% | | |
| Melite - 40 | | 4.4 | 2.2 | 0.21% | Total | 100.0% |
| Soda Ash, FMC | | 212.8 | 106.4 | 9.94% | | |
| Coal, Carbocite #20 | | 0.74 | 0.3693 | 0.03% | | |
| Copper Oxide | | 0.125 | 0.063 | 0.000 | | |
| TOTALS | | 2139.4 | 1069.7 | 99.87% | | |
| | | | | | | |
| After Melting: | | | | | | |
| Glass | | 2000.0 | 1000.0 | | | |
| LOI | | 142.1 | 71.1 | | | |
| Total | | 2142.1 | 1071.1 | | | |

Glass Color and Redox Properties

| Color (amber, green, clear) | Amber |
| --- | --- |
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -51.81 |

Figure 9(c)
Glass Batch Formulations Using 3-Mix Cullet
Example Batches and Resultant Glass Properties

Melt Identification

| Scenario Name: USA Production, 2/3 clear removed | | | | Cullet Color Percents | |
|---|---|---|---|---|---|
| | | | | 31.5 Clear | |
| Cullet Percentage | 75.0% | | | 52.2 Amber | |
| | | | | 16.3 Green | |

Batch Formulation          Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 473 | | 236.25 | | SiO2 | 71.9% |
| Amber | 783 | | 391.5 | | Al2O3 | 1.7% |
| Green | 245 | | 122.25 | | CaO | 10.9% |
| TOTAL | | 1500 | 750 | 72.58% | MgO | 1.0% |
| | | | | | Na2O | 13.5% |
| *Virgin Raw Materials* | | | | | K2O | 0.1% |
| Sand, US Silica | | 332.0 | 166.0 | 16.06% | Fe2O3 | 0.200% |
| Limestone | | 39.6 | 19.8 | 1.92% | TiO2 | 0.135% |
| Aplite, US Silica | | 0.0 | 0.0 | 0.00% | S(total) | 0.392% |
| Calumite | | 78.9 | 39.4 | 3.82% | Cr2O3 | 0.024% |
| Salt Cake | | 15.3 | 7.7 | 0.74% | | |
| Melite - 40 | | 0.6 | 0.3 | 0.03% | Total | 100.0% |
| Soda Ash, FMC | | 96.5 | 48.3 | 4.67% | | |
| Coal, Carbocite #20 | | 0.93 | 0.4672 | 0.05% | | |
| Copper Oxide | | 0.317 | 0.158 | 0.000 | | |
| TOTALS | | 2064.1 | 1032.1 | 99.87% | | |
| | | | | | | |
| After Melting: | | | | | | |
| Glass | | 2000.0 | 1000.0 | | | |
| LOI | | 66.7 | 33.3 | | | |
| Total | | 2066.7 | 1033.3 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -49.47 |

Figure 10(a)
Glass Batch Formulations Using 3-Mix Cullet
Example Batches and Resultant Glass Properties

Melt Identification

| Scenario Name: Trend to Amber | | | | Cullet Color Percents |
|---|---|---|---|---|
| Cullet Percentage | 25.0% | | | 52.9 Clear<br>38.0 Amber<br>9.1 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 265 | | 132.25 | | SiO2 | 71.5% |
| Amber | 190 | | 95 | | Al2O3 | 1.7% |
| Green | 46 | | 22.75 | | CaO | 10.9% |
| TOTAL | | 500 | 250 | 22.62% | MgO | 1.5% |
| | | | | | Na2O | 13.5% |
| *Virgin Raw Materials* | | | | | K2O | 0.1% |
| Sand, US Silica | | 988.6 | 494.3 | 44.72% | Fe2O3 | 0.200% |
| Limestone | | 142.2 | 71.1 | 6.43% | TiO2 | 0.175% |
| Aplite, US Silica | | 0.0 | 0.0 | 0.00% | S(total) | 0.392% |
| Calumite | | 220.6 | 110.3 | 9.98% | Cr2O3 | 0.005% |
| Salt Cake | | 17.7 | 8.8 | 0.80% | | |
| Melite - 40 | | 8.5 | 4.3 | 0.39% | Total | 100.0% |
| Soda Ash, FMC | | 329.8 | 164.9 | 14.92% | | |
| Coal, Carbocite #20 | | 0.19 | 0.0972 | 0.01% | | |
| Copper Oxide | | 0.000 | 0.000 | 0.000 | | |
| TOTALS | | 2207.5 | 1103.8 | 99.87% | | |
| | | | | | | |
| After Melting: | | | | | | |
| Glass | | 2000.0 | 1000.0 | | | |
| LOI | | 210.4 | 105.2 | | | |
| Total | | 2210.4 | 1105.2 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.60 |

Figure 10(b)
Glass Batch Formulations Using 3-Mix Cullet
Example Batches and Resultant Glass Properties

Melt Identification

| Scenario Name: Trend to Amber | | Cullet Color Percents |
|---|---|---|
| | | 52.9 Clear |
| Cullet Percentage | 50.0% | 38.0 Amber |
| | | 9.1 Green |

Batch Formulation — Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | 2000 lbs glass | 1000 g glass | Percent | | |
| Clear | 529 | | 264.5 | | SiO2 | 71.7% |
| Amber | 380 | | 190 | | Al2O3 | 1.7% |
| Green | 91 | | 45.5 | | CaO | 10.9% |
| TOTAL | | 1000 | 500 | 46.75% | MgO | 1.3% |
| | | | | | Na2O | 13.5% |
| *Virgin Raw Materials* | | | | | K2O | 0.1% |
| Sand, US Silica | | 660.7 | 330.3 | 30.89% | Fe2O3 | 0.200% |
| Limestone | | 91.0 | 45.5 | 4.25% | TiO2 | 0.148% |
| Aplite, US Silica | | 0.0 | 0.0 | 0.00% | S(total) | 0.392% |
| Calumite | | 149.0 | 74.5 | 6.96% | Cr2O3 | 0.009% |
| Salt Cake | | 16.8 | 8.4 | 0.78% | | |
| Melite - 40 | | 5.4 | 2.7 | 0.25% | Total | 100.0% |
| Soda Ash, FMC | | 213.0 | 106.5 | 9.96% | | |
| Coal, Carbocite #20 | | 0.75 | 0.3741 | 0.03% | | |
| Copper Oxide | | 0.000 | 0.000 | 0.000 | | |
| TOTALS | | 2136.5 | 1068.2 | 99.89% | | |
| | | | | | | |
| After Melting: | | | | | | |
| Glass | | 2000.0 | 1000.0 | | | |
| LOI | | 138.9 | 69.5 | | | |
| Total | | 2138.9 | 1069.5 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.42 |

Figure 10(c)
Glass Batch Formulations Using 3-Mix Cullet
Example Batches and Resultant Glass Properties

Melt Identification

| Scenario Name: Trend to Amber | | | | Cullet Color Percents |
|---|---|---|---|---|
| Cullet Percentage | 75.0% | | | 52.9 Clear<br>38.0 Amber<br>9.1 Green |

Batch Formulation      Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 794 | | 396.75 | | SiO2 | 72.0% |
| Amber | 570 | | 285 | | Al2O3 | 1.7% |
| Green | 137 | | 68.25 | | CaO | 10.9% |
| TOTAL | | 1500 | 750 | 72.55% | MgO | 1.0% |
| | | | | | Na2O | 13.5% |
| *Virgin Raw Materials* | | | | | K2O | 0.1% |
| Sand, US Silica | | 332.7 | 166.4 | 16.09% | Fe2O3 | 0.200% |
| Limestone | | 39.7 | 19.9 | 1.92% | TiO2 | 0.122% |
| Aplite, US Silica | | 0.0 | 0.0 | 0.00% | S(total) | 0.392% |
| Calumite | | 77.4 | 38.7 | 3.74% | Cr2O3 | 0.014% |
| Salt Cake | | 15.9 | 7.9 | 0.77% | | |
| Melite - 40 | | 2.2 | 1.1 | 0.11% | Total | 100.0% |
| Soda Ash, FMC | | 96.1 | 48.1 | 4.65% | | |
| Coal, Carbocite #20 | | 1.27 | 0.6329 | 0.06% | | |
| Copper Oxide | | 0.063 | 0.032 | 0.000 | | |
| TOTALS | | 2065.4 | 1032.7 | 99.90% | | |
| | | | | | | |
| After Melting: | | | | | | |
| Glass | | 2000.0 | 1000.0 | | | |
| LOI | | 67.4 | 33.7 | | | |
| Total | | 2067.4 | 1033.7 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -52.57 |

Figure 11(a)
Glass Batch Formulations Using 3-Mix Cullet
Example Batches and Resultant Glass Properties

Melt Identification

| Scenario Name: Beer Belt Blend | | Cullet Color Percents |
|---|---|---|
| | | 55.0 Clear |
| Cullet Percentage | 25.0% | 40.0 Amber |
| | | 5.0 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| Cullet | (by color) | 2000 lbs glass | 1000 g glass | Percent | | |
| Clear | 275 | | 137.5 | | SiO2 | 71.5% |
| Amber | 200 | | 100 | | Al2O3 | 1.7% |
| Green | 25 | | 12.5 | | CaO | 10.9% |
| TOTAL | | 500 | 250 | 22.62% | MgO | 1.5% |
| | | | | | Na2O | 13.5% |
| *Virgin Raw Materials* | | | | | K2O | 0.1% |
| Sand, US Silica | | 988.6 | 494.3 | 44.73% | Fe2O3 | 0.200% |
| Limestone | | 142.2 | 71.1 | 6.43% | TiO2 | 0.175% |
| Aplite, US Silica | | 0.0 | 0.0 | 0.00% | S(total) | 0.392% |
| Calumite | | 220.6 | 110.3 | 9.98% | Cr2O3 | 0.002% |
| Salt Cake | | 17.6 | 8.8 | 0.80% | | |
| Melite - 40 | | 8.5 | 4.3 | 0.38% | Total | 100.0% |
| Soda Ash, FMC | | 329.8 | 164.9 | 14.92% | | |
| Coal, Carbocite #20 | | 0.21 | 0.1071 | 0.01% | | |
| Copper Oxide | | 0.000 | 0.000 | 0.000 | | |
| TOTALS | | 2207.6 | 1103.8 | 99.87% | | |
| | | | | | | |
| After Melting: | | | | | | |
| Glass | | 2000.0 | 1000.0 | | | |
| LOI | | 210.4 | 105.2 | | | |
| Total | | 2210.4 | 1105.2 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -54.11 |

Figure 11(b)
Glass Batch Formulations Using 3-Mix Cullet
Example Batches and Resultant Glass Properties

Melt Identification

| Scenario Name: Beer Belt Blend | | Cullet Color Percents |
|---|---|---|
| Cullet Percentage | 50.0% | 55.0 Clear<br>40.0 Amber<br>5.0 Green |

Batch Formulation          Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 550 | | 275 | | SiO2 | 71.7% |
| Amber | 400 | | 200 | | Al2O3 | 1.7% |
| Green | 50 | | 25 | | CaO | 10.9% |
| TOTAL | | 1000 | 500 | 46.75% | MgO | 1.3% |
| | | | | | Na2O | 13.5% |
| *Virgin Raw Materials* | | | | | K2O | 0.1% |
| Sand, US Silica | | 660.8 | 330.4 | 30.89% | Fe2O3 | 0.200% |
| Limestone | | 91.0 | 45.5 | 4.25% | TiO2 | 0.148% |
| Aplite, US Silica | | 0.0 | 0.0 | 0.00% | S(total) | 0.392% |
| Calumite | | 149.0 | 74.5 | 6.97% | Cr2O3 | 0.005% |
| Salt Cake | | 16.7 | 8.4 | 0.78% | | |
| Melite - 40 | | 5.3 | 2.7 | 0.25% | Total | 100.0% |
| Soda Ash, FMC | | 213.0 | 106.5 | 9.96% | | |
| Coal, Carbocite #20 | | 0.74 | 0.3710 | 0.03% | | |
| Copper Oxide | | 0.000 | 0.000 | 0.000 | | |
| TOTALS | | 2136.5 | 1068.3 | 99.89% | | |
| | | | | | | |
| After Melting: | | | | | | |
| Glass | | 2000.0 | 1000.0 | | | |
| LOI | | 139.0 | 69.5 | | | |
| Total | | 2139.0 | 1069.5 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.59 |

Figure 11(c)
Glass Batch Formulations Using 3-Mix Cullet
Example Batches and Resultant Glass Properties

Melt Identification

| Scenario Name: Beer Belt Blend | | Cullet Color Percents |
|---|---|---|
| | | 55.0 Clear |
| Cullet Percentage | 75.0% | 40.0 Amber |
| | | 5.0 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 825 | | 412.5 | | SiO2 | 72.0% |
| Amber | 600 | | 300 | | Al2O3 | 1.7% |
| Green | 75 | | 37.5 | | CaO | 10.9% |
| TOTAL | | 1500 | 750 | 72.55% | MgO | 1.0% |
| | | | | | Na2O | 13.5% |
| *Virgin Raw Materials* | | | | | K2O | 0.1% |
| Sand, US Silica | | 332.9 | 166.5 | 16.10% | Fe2O3 | 0.200% |
| Limestone | | 39.7 | 19.9 | 1.92% | TiO2 | 0.122% |
| Aplite, US Silica | | 0.0 | 0.0 | 0.00% | S(total) | 0.392% |
| Calumite | | 77.4 | 38.7 | 3.75% | Cr2O3 | 0.008% |
| Salt Cake | | 15.8 | 7.9 | 0.76% | | |
| Melite - 40 | | 2.2 | 1.1 | 0.10% | Total | 100.0% |
| Soda Ash, FMC | | 96.2 | 48.1 | 4.65% | | |
| Coal, Carbocite #20 | | 1.29 | 0.6463 | 0.06% | | |
| Copper Oxide | | 0.000 | 0.000 | 0.000 | | |
| TOTALS | | 2065.5 | 1032.8 | 99.90% | | |
| | | | | | | |
| After Melting: | | | | | | |
| Glass | | 2000.0 | 1000.0 | | | |
| LOI | | 67.5 | 33.8 | | | |
| Total | | 2067.5 | 1033.8 | | | |

Glass Color and Redox Properties

| Color (amber, green, clear) | Amber |
|---|---|
| Thickness, mm | 3.2 |
| 450 Transmission | 0.0 |
| 550 Transmission | 11.5 |
| 650 Transmission | 23.0 |
| Redness Ratio (T650/T550) | 2.0 |
| Batch Redox Number | -53.48 |

Figure 12(a)

Glass Batch Formulation with Mixed Cullet -- GREEN GLASS

Page 1 -- Main Program: Raw Materials and Input Values

Raw Materials Data Base: Standard Soda Lime Silicate

Scenario Name: East/West Coast Three Mix

**\*\*\*\* GLASS RAW MATERIALS (Enter raw material properties and costs) \*\*\*\***

| Cullet | | SiO2 | Al2O3 | CaO | MgO | BaO | Na2O | K2O | Fe2O3 | TiO2 | S(total) | Cr2O3 | COD | LOI | Total | RN |
|---|---|---|---|---|---|---|---|---|---|---|---|---|---|---|---|---|
| Clear | | 71.90% | 1.70% | 11.10% | 0.73% | | 13.80% | 0.16% | 0.15% | 0.05% | 0.20% | 0.00% | 0.05% | 0.15% | 99.99% | -1.19% |
| Amber | | 71.90% | 1.70% | 11.10% | 0.73% | | 13.80% | 0.16% | 0.29% | 0.15% | 0.25% | 0.00% | 0.10% | 0.00% | 100.18% | -2.37% |
| Green | | 71.90% | 1.70% | 11.10% | 0.73% | | 13.80% | 0.16% | 0.20% | 0.10% | 0.20% | 0.20% | 0.05% | 0.00% | 100.14% | -1.19% |
| | | | | | | | | | | | | | | | | |
| Raw Materials | Cost | | | | | | | | | | | | | | | |
| Sand, US Silica | 50.00 | 99.690% | 0.094% | 0.005% | 0.006% | | 0.003% | 0.016% | 0.037% | 0.023% | | | 0.015% | 0.122% | 100.0% | 0.00 |
| Limestone | 35.00 | 1.000% | | 54.910% | 0.450% | | | | 0.050% | | | | 0.050% | 43.580% | 100.1% | -0.01 |
| Aplite, US Silica | 60.00 | 62.190% | 22.320% | 5.850% | 0.036% | | 5.910% | 2.750% | 0.112% | 0.530% | 0.060% | | 0.012% | 0.242% | 100.0% | 0.00 |
| Calumite | 48.00 | 36.480% | 11.110% | 36.930% | 11.630% | | 0.500% | 0.350% | 0.280% | 1.240% | 1.290% | | 1.000% | 0.230% | 101.0% | -0.24 |
| Salt Cake | 155.00 | | | | | | 43.600% | | | | 22.58% | | | 33.812% | 100.0% | 1.00 |
| Nefite | 52.00 | 28.345% | 8.632% | 28.695% | 9.037% | | 0.389% | 0.277% | 22.300% | 0.963% | | | 1.000% | 1.368% | 101.0% | -0.24 |
| Soda Ash | 130.00 | | | | | | 58.400% | | | | | | | 41.600% | 100.0% | 0.00 |
| Carbocite #20 | 35.00 | 8.800% | 6.099% | 0.192% | 0.096% | | 0.704% | | 0.330% | 0.291% | 0.035% | | 78.000% | 5.450% | 100.0% | -18.49 |
| Iron Chromite, FeCr2O4 | 848.00 | | | | | | | | 31.500% | | | 45.900% | 0.500% | 22.600% | 100.5% | -0.12 |
| Chrome Oxide, Cr2O3 | 1250.00 | | | | | | | | 0.000% | | | 100.000% | 0.000% | 0.000% | 100.0% | 0.00 |

**\*\*\*\* USER INPUT: SPECIFY GLASS COLOR AND CULLET USAGE HERE \*\*\*\***

| | User Input | Reference | Computed |
|---|---|---|---|
| Color (amber, green, clear) | Green | | | <-=========== Color of Glass, Fixed as GREEN
| Thickness, mm | 3.18 | | | <-=========== Thickness of transmission specimen, Fixed as 3.18 mm
| | | | | |
| Cr2O3 Conc in Glass | 0.23% | 0.230% | 0.229% | <-=========== Enter target Cr2O3 Concentration
| Fe2O3 Conc in Glass | 0.25% | 0.250% | 0.250% | <-=========== Enter target Fe2O3 Concentration
| 550 Transmission | | 73.5 | 70.2 | |
| | | | | |
| Redox Number | -30 | -30 | -30 | <-=========== Enter target Redox Number
| | | | | |
| Cullet, percent of glass: | 35.0% | | | <-=========== Enter cullet fraction, as a percent of glass
| | | | | |
| Three Mix Ratio: | | | | <-=========== Enter three-mix ratios
| Clear ====> | 47.2 | | | |
| Amber ====> | 27.2 | | | |
| Green ====> | 25.5 | | | | continued

Figure 12(b)

Glass Batch Formulation with Mixed Cullet – GREEN GLASS

Page 2 – Main Program: Calculated Values

*** GLASS BATCH FORMULA (computed batch weights appear in Batch Column) ***

| Cullet | Wt. Lbs | Percent | SiO2 | Al2O3 | CuO | CaO | MgO | BaO | Na2O | K2O | Fe2O3 | TiO2 | S(total) | Cr2O3 | COD | LOI | Total | RN |
|---|---|---|---|---|---|---|---|---|---|---|---|---|---|---|---|---|---|---|
| TOTAL | 700 | | | | | | | | | | | | | | | | | |
| Clear | 331 | 16.54% | 297.78 | 5.62 | 0.00 | 36.71 | 2.41 | 0.00 | 45.64 | 0.53 | 0.50 | 0.17 | 0.66 | 0.00 | 0.17 | 0.50 | 390.68 | -3.92 |
| Amber | 191 | 9.53% | 137.11 | 3.24 | 0.00 | 21.17 | 1.39 | 0.00 | 26.32 | 0.31 | 0.56 | 0.28 | 0.48 | 0.00 | 0.19 | 0.00 | 191.05 | -4.52 |
| Green | 179 | 8.93% | 128.40 | 3.04 | 0.00 | 19.82 | 1.30 | 0.00 | 24.65 | 0.29 | 0.36 | 0.18 | 0.36 | 0.36 | 0.09 | 0.00 | 178.84 | -2.12 |

| Raw Materials | Batch Weight | Cost | SiO2 | Al2O3 | CuO | CaO | MgO | BaO | Na2O | K2O | Fe2O3 | TiO2 | S(total) | Cr2O3 | COD | LOI | Total | RN |
|---|---|---|---|---|---|---|---|---|---|---|---|---|---|---|---|---|---|---|
| Sand, US Silica, #4 | 875.8 | 40.00 | 873.07 | 0.82 | 0.00 | 0.08 | 0.05 | 0.00 | 0.03 | 0.14 | 0.32 | 0.20 | 0.00 | 0.00 | 0.13 | 1.07 | 875.91 | -3.11 |
| Limestone, Global Stone | 259.9 | 20.00 | 2.60 | 0.00 | 0.00 | 142.72 | 1.17 | 0.00 | 0.00 | 0.00 | 0.13 | 0.00 | 0.00 | 0.00 | 0.13 | 113.30 | 260.04 | -3.08 |
| Aplite, US Silica | 97.53 | 40.00 | 60.65 | 21.77 | 0.00 | 5.71 | 0.04 | 0.00 | 5.76 | 2.68 | 0.11 | 0.52 | 0.06 | 0.00 | 0.01 | 0.24 | 97.54 | -0.28 |
| Columita, Weirton, WV | 0.0 | 50.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.01 | 0.00 |
| Salt Cake | 24.1 | 100.00 | 0.00 | 0.00 | 0.00 | 0.00 | 0.00 | 0.00 | 10.51 | 0.00 | 0.00 | 0.00 | 5.45 | 0.00 | 0.00 | 8.15 | 24.11 | 24.11 |
| Melite - 40, Moundsville | 0.80 | 50.00 | 0.23 | 0.07 | 0.00 | 0.23 | 0.07 | 0.00 | 0.00 | 0.00 | 0.18 | 0.01 | 0.00 | 0.00 | 0.01 | 0.01 | 0.81 | -0.19 |
| Soda Ash, FMC, TG, RP | 269.8 | 50.00 | 0.00 | 0.00 | 0.00 | 0.00 | 0.00 | 0.00 | 157.56 | 0.00 | 0.01 | 0.01 | 0.00 | 0.00 | 0.00 | 112.23 | 269.79 | 0.00 |
| Carbocite #20 | 1.94 | 18.00 | 0.17 | 0.12 | 0.00 | 0.00 | 0.00 | 0.00 | 0.01 | 0.00 | 0.01 | 0.01 | 0.00 | 0.00 | 1.51 | 0.11 | 1.94 | -35.82 |
| Iron Chromite, FeCr2O4 | 9.010E+00 | 20.00 | 0.00 | 0.00 | 0.00 | 0.00 | 0.00 | 0.00 | 0.00 | 0.00 | 2.84 | 0.00 | 0.00 | 4.14 | 0.05 | 2.04 | 9.05 | -1.07 |
| Chrome Oxide, Cr2O3 | 9.400E-02 | 100.00 | 0.00 | 0.00 | 0.00 | 0.00 | 0.00 | 0.00 | 0.00 | 0.00 | 0.00 | 0.00 | 0.00 | 0.09 | 0.00 | 0.00 | 0.09 | 0.00 |
| TOTALS | 1539 | 388.00 | 1440.02 | 34.68 | 0.00 | 226.44 | 6.44 | 0.00 | 270.48 | 3.94 | 5.00 | 1.36 | 7.00 | 4.59 | 2.28 | 237.63 | 2239.87 | -30.00 |

| | Total | Percent |
|---|---|---|
| Glass | 1999.95 | 89.3% |
| LOI | 239.92 | 10.7% |
| Total | 2239.87 | 100.0% |

*** GLASS OXIDE FORMULA (Enter target glass composition) ***

| | SiO2 | Al2O3 | CaO | MgO | BaO | Na2O | K2O | Fe2O3 | TiO2 | S(tot) | Cr2O3 | COD | RN |
|---|---|---|---|---|---|---|---|---|---|---|---|---|---|
| Glass Oxides = | | | | | | | | | | | | | |
| Target Glass (default given) ⇒ | 71.90% | 1.70% | 11.10% | 0.00% | | 13.80% | 0.16% | 0.250% | 0.350% | 0.230% | | | -.30 |
| Calculated Oxide Composition ⇒ | 72.00% | 1.73% | 11.32% | 0.32% | | 13.52% | 0.20% | 0.250% | 0.068% | 0.350% | 0.229% | 0.114% | -.30 |

| Glass*100 | |
|---|---|
| | 100.00 |
| | 12.00 |
| | 112.00 |

*** End of Main ***

Figure 12(c)
Green Glass Batch Formulations Using 3-Mix Cullet
Example Batches and Resultant Glass Properties

Melt Identification

| Scenario Name: East/West Coast Three Mix | | Cullet Color Percents |
|---|---|---|
| | | 47.2 Clear |
| Cullet Percentage | 35.0% | 27.2 Amber |
| | | 25.5 Green |

Batch Formulation                                             Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | 2000 lbs glass | 1000 g glass | Percent | | |
| Clear | 331 | | 165.4 | | SiO2 | 72.0% |
| Amber | 191 | | 95.3 | | Al2O3 | 1.7% |
| Green | 179 | | 89.3 | | CaO | 11.3% |
| TOTAL | | 700 | 350 | 31.25% | MgO | 0.3% |
| | | | | | Na2O | 13.5% |
| *Virgin Raw Materials* | | | | | K2O | 0.2% |
| Sand, US Silica | | 875.8 | 437.9 | 39.10% | Fe2O3 | 0.250% |
| Limestone | | 259.9 | 130.0 | 11.60% | TiO2 | 0.068% |
| Aplite, US Silica | | 97.53 | 48.8 | 4.35% | S(total) | 0.350% |
| Calumite | | 0.0 | 0.0 | 0.00% | Cr2O3 | 0.229% |
| Salt Cake | | 24.1 | 12.1 | 1.08% | | |
| Melite - 40 | | 0.80 | 0.4 | 0.04% | Total | 100.0% |
| Soda Ash, FMC | | 269.8 | 134.9 | 12.05% | | |
| Coal, Carbocite #20 | | 1.94 | 1.0 | 0.09% | | |
| Iron Chromite, FeCr2O4 | | 9.010E+00 | 4.5048 | 0.402% | | |
| Chrome Oxide, Cr2O3 | | 9.400E-02 | 0.0470 | 0.004% | | |
| TOTALS | | 2239.0 | 1119.5 | 99.96% | | |
| | | | | | | |
| After Melting: | | | | | | |
| Glass | | 2000.0 | 1000.0 | | | |
| LOI | | 239.9 | 120.0 | | | |
| Total | | 2239.9 | 1119.9 | | | |

Glass Color and Redox Properties

| Color (amber, green, clear) | Green |
|---|---|
| Thickness, mm | 3.18 |
| 550 Transmission | 70.2 |
| Redox Number | -30.00 |

Figure 12(d)
Green Glass Batch Formulations Using 3-Mix Cullet
Example Batches and Resultant Glass Properties

Melt Identification

| Scenario Name: East/West Coast Three Mix | | Cullet Color Percents |
|---|---|---|
| Cullet Percentage | 70.0% | 47.2 Clear |
| | | 27.2 Amber |
| | | 25.5 Green |

Batch Formulation                                             Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | 2000 lbs glass | 1000 g glass | Percent | | |
| Clear | 661 | | 330.7 | | $SiO_2$ | 71.2% |
| Amber | 381 | | 190.7 | | $Al_2O_3$ | 1.7% |
| Green | 357 | | 178.6 | | CaO | 11.3% |
| TOTAL | | 1400 | 700 | 66.02% | MgO | 0.5% |
| | | | | | $Na_2O$ | 14.1% |
| *Virgin Raw Materials* | | | | | $K_2O$ | 0.2% |
| Sand, US Silica | | 388.9 | 194.5 | 18.34% | $Fe_2O_3$ | 0.250% |
| Limestone | | 124.3 | 62.2 | 5.86% | $TiO_2$ | 0.080% |
| Aplite, US Silica | | 46.77 | 23.4 | 2.21% | S(total) | 0.350% |
| Calumite | | 0.0 | 0.0 | 0.00% | $Cr_2O_3$ | 0.230% |
| Salt Cake | | 17.6 | 8.8 | 0.83% | | |
| Melite - 40 | | 0.00 | 0.0 | 0.00% | Total | 100.0% |
| Soda Ash, FMC | | 133.3 | 66.7 | 6.29% | | |
| Coal, Carbocite #20 | | 1.23 | 0.6 | 0.06% | | |
| Iron Chromite, $FeCr_2O_4$ | | 6.055E+00 | 3.0277 | 0.286% | | |
| Chrome Oxide, $Cr_2O_3$ | | 1.106E+00 | 0.5531 | 0.052% | | |
| TOTALS - | | 2119.3 | 1059.7 | 99.94% | | |
| | | | | | | |
| After Melting: | | | | | | |
| Glass | | 2000.0 | 1000.0 | | | |
| LOI | | 120.6 | 60.3 | | | |
| Total | | 2120.6 | 1060.3 | | | |

Glass Color and Redox Properties

Figure 13(a)
Green Glass Batch Formulations Using 3-Mix Cullet
Example Batches and Resultant Glass Properties

Melt Identification

| Scenario Name: USA Production Three Mix | | Cullet Color Percents |
|---|---|---|
| | | 58.0 Clear |
| Cullet Percentage | 25.0% | 32.0 Amber |
| | | 10.0 Green |

Batch Formulation            Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | (2000 lbs glass) | (1000 g glass) | Percent | | |
| Clear | 290 | | 145.0 | | SiO2 | 72.6% |
| Amber | 160 | | 80.0 | | Al2O3 | 1.7% |
| Green | 50 | | 25.0 | | CaO | 10.9% |
| TOTAL | | 500 | 250 | 21.90% | MgO | 0.3% |
| | | | | | Na2O | 13.5% |
| *Virgin Raw Materials* | | | | | K2O | 0.2% |
| Sand, US Silica | | 1033.0 | 516.5 | 45.25% | Fe2O3 | 0.250% |
| Limestone | | 286.0 | 143.0 | 12.53% | TiO2 | 0.062% |
| Aplite, US Silica | | 106.89 | 53.4 | 4.68% | S(total) | 0.350% |
| Calumite | | 0.0 | 0.0 | 0.00% | Cr2O3 | 0.226% |
| Salt Cake | | 26.1 | 13.0 | 1.14% | | |
| Melite - 40 | | 1.42 | 0.7 | 0.06% | Total | 100.0% |
| Soda Ash, FMC | | 317.2 | 158.6 | 13.89% | | |
| Coal, Carbocite #20 | | 2.13 | 1.1 | 0.09% | | |
| Iron Chromite, FeCr2O4 | | 9.699E+00 | 4.850E+00 | 4.248E-03 | | |
| Chrome Oxide, Cr2O3 | | 0.000E+00 | 0.000E+00 | 0.000E+00 | | |
| TOTALS | | 2282.4 | 1141.2 | 99.97% | | |
| | | | | | | |
| After Melting: | | | | | | |
| Glass | | 2011.0 | 1005.5 | | | |
| LOI | | 272.1 | 136.0 | | | |
| Total | | 2283.1 | 1141.5 | | | |

Glass Color and Redox Properties

| Color (amber, green, clear) | Green |
|---|---|
| Thickness, mm | 3.18 |
| 550 Transmission | 70.6 |
| Redox Number | -30.00 |

Figure 13(b)
Green Glass Batch Formulations Using 3-Mix Cullet
Example Batches and Resultant Glass Properties

Melt Identification

| Scenario Name: USA Production Three Mix | | Cullet Color Percents |
|---|---|---|
| | | 58.0 Clear |
| Cullet Percentage | 50.0% | 32.0 Amber |
| | | 10.0 Green |

Batch Formulation                                                    Oxide Composition

| | Cullet | Total Batch | | | Oxide | Wt. Pct. |
|---|---|---|---|---|---|---|
| | weight, lbs. | Weight, lbs. | Weight, g | | | |
| Cullet | (by color) | (2000 lbs glass) | (1000 g glass) | Percent | | |
| Clear | 580 | | 290.0 | | $SiO_2$ | 71.4% |
| Amber | 320 | | 160.0 | | $Al_2O_3$ | 1.7% |
| Green | 100 | | 50.0 | | CaO | 11.3% |
| TOTAL | | 1000 | 500 | 45.59% | MgO | 0.4% |
| | | | | | $Na_2O$ | 14.1% |
| *Virgin Raw Materials* | | | | | $K_2O$ | 0.2% |
| Sand, US Silica | | 660.8 | 330.4 | 30.13% | $Fe_2O_3$ | 0.250% |
| Limestone | | 201.6 | 100.8 | 9.19% | $TiO_2$ | 0.071% |
| Aplite, US Silica | | 75.68 | 37.8 | 3.45% | S(total) | 0.350% |
| Calumite | | 0.0 | 0.0 | 0.00% | $Cr_2O_3$ | 0.230% |
| Salt Cake | | 21.2 | 10.6 | 0.97% | | |
| Melite - 40 | | 0.81 | 0.4 | 0.04% | Total | 100.0% |
| Soda Ash, FMC | | 222.2 | 111.1 | 10.13% | | |
| Coal, Carbocite #20 | | 1.60 | 0.8 | 0.07% | | |
| Iron Chromite, $FeCr_2O_4$ | | 7.533E+00 | 3.767E+00 | 3.435E-03 | | |
| Chrome Oxide, $Cr_2O_3$ | | 9.332E-01 | 4.666E-01 | 4.255E-04 | | |
| TOTALS | | 2192.4 | 1096.2 | 99.96% | | |
| | | | | | | |
| After Melting: | | | | | | |
| Glass | | 2000.0 | 1000.0 | | | |
| LOI | | 193.3 | 96.7 | | | |
| Total | | 2193.3 | 1096.7 | | | |

Glass Color and Redox Properties

| Color (amber, green, clear) | Green |
|---|---|
| Thickness, mm | 3.18 |
| 550 Transmission | 70.2 |
| Redox Number | -30.00 |

Figure 13(c)
Green Glass Batch Formulations Using 3-Mix Cullet
Example Batches and Resultant Glass Properties

Melt Identification

| Scenario Name: USA Production Three Mix | | Cullet Color Percents |
|---|---|---|
| Cullet Percentage | 75.0% | 58.0 Clear<br>32.0 Amber<br>10.0 Green |

Batch Formulation                                                          Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 870 | | 435.0 | | SiO2 | 71.2% |
| Amber | 480 | | 240.0 | | Al2O3 | 1.7% |
| Green | 150 | | 75.0 | | CaO | 11.3% |
| TOTAL | | 1500 | 750 | 71.34% | MgO | 0.6% |
| | | | | | Na2O | 14.1% |
| *Virgin Raw Materials* | | | | | K2O | 0.2% |
| Sand, US Silica | | 320.9 | 160.4 | 15.26% | Fe2O3 | 0.250% |
| Limestone | | 104.6 | 52.3 | 4.98% | TiO2 | 0.079% |
| Aplite, US Silica | | 39.26 | 19.6 | 1.87% | S(total) | 0.350% |
| Calumite | | 0.0 | 0.0 | 0.00% | Cr2O3 | 0.232% |
| Salt Cake | | 16.5 | 8.3 | 0.79% | | |
| Melite - 40 | | 0.56 | 0.3 | 0.03% | Total | 100.0% |
| Soda Ash, FMC | | 111.2 | 55.6 | 5.29% | | |
| Coal, Carbocite #20 | | 1.07 | 0.5 | 0.05% | | |
| Iron Chromite, FeCr2O4 | | 5.195E+00 | 2.598E+00 | 2.471E-03 | | |
| Chrome Oxide, Cr2O3 | | 1.953E+00 | 9.764E-01 | 9.289E-04 | | |
| TOTALS | | 2101.3 | 1050.7 | 99.95% | | |
| | | | | | | |
| After Melting: | | | | | | |
| Glass | | 2000.0 | 1000.0 | | | |
| LOI | | 102.5 | 51.2 | | | |
| Total | | 2102.5 | 1051.2 | | | |

Glass Color and Redox Properties

| Color (amber, green, clear) | Green |
|---|---|
| Thickness, mm | 3.18 |
| 550 Transmission | 70.0 |
| Redox Number | -30.00 |

Figure 14(a)
Green Glass Batch Formulations Using 3-Mix Cullet
Example Batches and Resultant Glass Properties

Melt Identification

| Scenario Name: Beer Belt Blend | | Cullet Color Percents |
|---|---|---|
| Cullet Percentage | 25.0% | 55.0 Clear<br>40.0 Amber<br>5.0 Green |

Batch Formulation                                        Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 275 | | 137.5 | | SiO2 | 72.6% |
| Amber | 200 | | 100.0 | | Al2O3 | 1.7% |
| Green | 25 | | 12.5 | | CaO | 10.9% |
| TOTAL | | 500 | 250 | 22.11% | MgO | 0.3% |
| | | | | | Na2O | 13.5% |
| *Virgin Raw Materials* | | | | | K2O | 0.2% |
| Sand, US Silica | | 1021.4 | 510.7 | 45.17% | Fe2O3 | 0.250% |
| Limestone | | 281.8 | 140.9 | 12.46% | TiO2 | 0.064% |
| Aplite, US Silica | | 105.42 | 52.7 | 4.66% | S(total) | 0.350% |
| Calumite | | 0.0 | 0.0 | 0.00% | Cr2O3 | 0.228% |
| Salt Cake | | 25.7 | 12.9 | 1.14% | | |
| Melite - 40 | | 0.94 | 0.5 | 0.04% | Total | 100.0% |
| Soda Ash, FMC | | 313.4 | 156.7 | 13.86% | | |
| Coal, Carbocite #20 | | 2.10 | 1.0 | 0.09% | | |
| Iron Chromite, FeCr2O4 | | 9.775E+00 | 4.888E+00 | 4.323E-03 | | |
| Chrome Oxide, Cr2O3 | | 0.000E+00 | 0.000E+00 | 0.000E+00 | | |
| TOTALS | | 2260.5 | 1130.3 | 99.97% | | |
| | | | | | | |
| After Melting: | | | | | | |
| Glass | | 1992.8 | 996.4 | | | |
| LOI | | 268.5 | 134.2 | | | |
| Total | | 2261.2 | 1130.6 | | | |

Glass Color and Redox Properties

| Color (amber, green, clear) | Green |
|---|---|
| Thickness, mm | 3.18 |
| 550 Transmission | 70.4 |
| Redox Number | -30.00 |

Figure 14(b)
Green Glass Batch Formulations Using 3-Mix Cullet
Example Batches and Resultant Glass Properties

Melt Identification

| Scenario Name: Beer Belt Blend | | Cullet Color Percents |
|---|---|---|
| | | 55.0 Clear |
| Cullet Percentage | 50.0% | 40.0 Amber |
| | | 5.0 Green |

Batch Formulation      Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | (2000 lbs glass) | (1000 g glass) | Percent | | |
| Clear | 550 | | 275.0 | | SiO2 | 71.4% |
| Amber | 400 | | 200.0 | | Al2O3 | 1.7% |
| Green | 50 | | 25.0 | | CaO | 11.3% |
| TOTAL | | 1000 | 500 | 45.59% | MgO | 0.4% |
| | | | | | Na2O | 14.1% |
| *Virgin Raw Materials* | | | | | K2O | 0.2% |
| Sand, US Silica | | 660.8 | 330.4 | 30.13% | Fe2O3 | 0.250% |
| Limestone | | 201.7 | 100.9 | 9.20% | TiO2 | 0.074% |
| Aplite, US Silica | | 75.76 | 37.9 | 3.45% | S(total) | 0.350% |
| Calumite | | 0.0 | 0.0 | 0.00% | Cr2O3 | 0.230% |
| Salt Cake | | 21.0 | 10.5 | 0.96% | | |
| Melite - 40 | | 0.62 | 0.3 | 0.03% | Total | 100.0% |
| Soda Ash, FMC | | 222.3 | 111.2 | 10.14% | | |
| Coal, Carbocite #20 | | 1.54 | 0.8 | 0.07% | | |
| Iron Chromite, FeCr2O4 | | 7.378E+00 | 3.689E+00 | 3.364E-03 | | |
| Chrome Oxide, Cr2O3 | | 1.114E+00 | 5.568E-01 | 5.078E-04 | | |
| TOTALS | | 2192.3 | 1096.1 | 99.95% | | |
| | | | | | | |
| After Melting: | | | | | | |
| Glass | | 2000.0 | 1000.0 | | | |
| LOI | | 193.3 | 96.6 | | | |
| Total | | 2193.3 | 1096.6 | | | |

Glass Color and Redox Properties

| Color (amber, green, clear) | Green |
|---|---|
| Thickness, mm | 3.18 |
| 550 Transmission | 70.2 |
| Redox Number | -30.00 |

Figure 14(c)
Green Glass Batch Formulations Using 3-Mix Cullet
Example Batches and Resultant Glass Properties

Melt Identification

| Scenario Name: Beer Belt Blend | | | | | Cullet Color Percents | |
|---|---|---|---|---|---|---|
| | | | | | 55.0 Clear | |
| Cullet Percentage | 75.0% | | | | 40.0 Amber | |
| | | | | | 5.0 Green | |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1000 g glass) | Percent | | |
| Clear | 825 | | 412.5 | | $SiO_2$ | 71.2% |
| Amber | 600 | | 300.0 | | $Al_2O_3$ | 1.7% |
| Green | 75 | | 37.5 | | CaO | 11.3% |
| TOTAL | | 1500 | 750 | 71.35% | MgO | 0.6% |
| | | | | | $Na_2O$ | 14.1% |
| *Virgin Raw Materials* | | | | | $K_2O$ | 0.2% |
| Sand, US Silica | | 320.9 | 160.4 | 15.26% | $Fe_2O_3$ | 0.250% |
| Limestone | | 104.6 | 52.3 | 4.98% | $TiO_2$ | 0.083% |
| Aplite, US Silica | | 39.31 | 19.7 | 1.87% | S(total) | 0.349% |
| Calumite | | 0.0 | 0.0 | 0.00% | $Cr_2O_3$ | 0.230% |
| Salt Cake | | 16.2 | 8.1 | 0.77% | | |
| Melite - 40 | | 0.51 | 0.3 | 0.02% | Total | 100.0% |
| Soda Ash, FMC | | 111.5 | 55.7 | 5.30% | | |
| Coal, Carbocite #20 | | 0.98 | 0.5 | 0.05% | | |
| Iron Chromite, $FeCr_2O_4$ | | 4.776E+00 | 2.388E+00 | 2.272E-03 | | |
| Chrome Oxide, $Cr_2O_3$ | | 2.261E+00 | 1.130E+00 | 1.075E-03 | | |
| TOTALS | | 2101.0 | 1050.5 | 99.94% | | |
| | | | | | | |
| After Melting: | | | | | | |
| Glass | | 2000.0 | 1000.0 | | | |
| LOI | | 102.3 | 51.1 | | | |
| Total | | 2102.3 | 1051.1 | | | |

Glass Color and Redox Properties

| Color (amber, green, clear) | Green |
|---|---|
| Thickness, mm | 3.18 |
| 550 Transmission | 70.2 |
| Redox Number | -30.00 |

Figure 15(a)

Glass Batch Formulation with Mixed Cullet -- CLEAR(Flint) Glass

Page 1 -- Main Program: Raw Materials and Input Values

Raw Materials Data Base: Standard Soda Lime Silicate

Cullet Scenario Name: Beer Belt Blend

*** GLASS RAW MATERIALS ***

| Cullet | SiO2 | Al2O3 | Co | CaO | MgO | Se | Na2O | K2O | Fe2O3 | TiO2 | S(total) | Cr2O3 | C | LOI | Total | COD |
|---|---|---|---|---|---|---|---|---|---|---|---|---|---|---|---|---|
| Clear | 71.90% | 1.70% | | 11.10% | 0.73% | | 13.80% | 0.16% | 0.15% | 0.05% | 0.20% | 0.00% | 0.05% | 0.15% | 99.99% | -1.19% |
| Amber | 71.90% | 1.70% | | 11.10% | 0.73% | | 13.80% | 0.16% | 0.29% | 0.15% | 0.25% | 0.00% | 0.10% | 0.00% | 100.18% | -2.37% |
| Green | 71.90% | 1.70% | | 11.10% | 0.73% | | 13.80% | 0.16% | 0.20% | 0.10% | 0.20% | 0.20% | 0.05% | 0.00% | 100.14% | -1.19% |

| Raw Materials | Cost $/ton | SiO2 | Al2O3 | Co | CaO | MgO | Se | Na2O | K2O | Fe2O3 | TiO2 | S(total) | Cr2O3 | C | LOI | Total | COD |
|---|---|---|---|---|---|---|---|---|---|---|---|---|---|---|---|---|---|
| Sand, US Silica | 40.00 | 99.690% | 0.094% | | 0.009% | 0.006% | | 0.003% | 0.016% | 0.037% | 0.023% | | | 0.015% | 0.122% | 100.0% | 0.00 |
| Limestone | 40.00 | 1.000% | | | 54.910% | 0.450% | | | | 0.050% | | | | 0.050% | 43.560% | 100.1% | -0.01 |
| Aplite, US Silica | 28.00 | 62.180% | 22.320% | | 5.850% | 0.035% | | 5.910% | 2.750% | 0.112% | 0.530% | 0.060% | | 0.012% | 0.242% | 100.0% | 0.00 |
| Columite | 32.00 | 36.480% | 11.110% | | 36.930% | 11.630% | | 0.500% | 0.350% | 0.280% | 1.240% | 1.250% | | 1.000% | 0.230% | 101.0% | -0.24 |
| Salt Cake | 100.00 | | | | | | | 43.500% | | | | 22.568% | | | 33.812% | 100.0% | 1.00 |
| Nellie - 40 | 65.00 | 28.345% | 8.632% | | 28.695% | 9.037% | | 0.369% | 0.272% | 22.300% | 0.963% | | | 1.000% | 1.368% | 101.0% | -0.24 |
| Soda Ash | 84.00 | | | | | | | 58.400% | | | | | | | 41.600% | 100.0% | 0.00 |
| Carbocite #20 | 30.00 | 8.800% | 6.099% | | 0.192% | 0.098% | | 0.704% | | 0.330% | 0.291% | 0.038% | | 78.000% | 5.450% | 100.0% | -18.49 |
| Ferro Cobalt Frit | 1000.00 | 50.000% | | 5.000% | | | | 45.000% | | | | | | | 0.000% | 100.0% | 0.00 |
| Ferro Selenium Frit | 1000.00 | 50.000% | | | | | 2.000% | 48.000% | | | | | | | 0.000% | 100.0% | 0.00 |
| Niter, NaNO3 | 200.00 | 0.00 | 0.00 | 0.00 | 0.00 | 0.00 | 0.00 | 36.470% | 0.00 | 0.00 | 0.00 | 0.00 | 0.00 | 0.00 | 63.530% | 100.0% | 4.18 |

*** USER INPUT: SPECIFY CULLET USAGE HERE ***

Color Parameters
- Total Fe: 8.4E-04
- Total Cr: 2.5E-05
- Total Fe & Cr: 8.7E-04
- Required Se: 3.0E-04
- Required Co: 1.7E-05

(Note: all color parameters are fixed. Algorithm calculates best flint composition for given cullet mix)
- Minimum value determined from cullet and raw batch -- calculated by model
- Values determined from cullet and raw batch -- calculated by model
- Values determined from cullet and raw batch -- calculated by model
- Each 0.02% Fe plus Cr in glass requires 60 ppm Se
- Each 0.02% Fe plus Cr in glass requires 4 ppm Co COD: 10
- Redox conditions set to oxidizing
- Note: LP algorithm is set to minimize Fe in glass Neutral Transmission [calc]: 71.1
Neutral transmission based on green 450 extinction Cullet, percent of glass: 25.0%

Three Mix Ratio:
- Clear ===>: 55.0
- Amber ===>: 40.0
- Green ===>: 5.0 continued

Figure 15(b)

Glass Batch Formulation with Mixed Cullet -- CLEAR(FLINT) GLASS

Page 2 -- Main Program: Calculated Values

*** GLASS BATCH FORMULA (computed batch weights appear in Batch Column) ***

| Cullet | Wt. Lbs | Percent | SiO2 | Al2O3 | Co | CaO | MgO | Se | Na2O | K2O | Fe2O3 | TiO2 | S(total) | Cr2O3 | C | LOI | Total | COD |
|---|---|---|---|---|---|---|---|---|---|---|---|---|---|---|---|---|---|---|
| TOTAL | 500 | | | | | | | | | | | | | | | | | |
| Clear | 275 | 13.75% | 197.73 | 4.68 | 0.00 | 30.53 | 2.01 | 0.00 | 37.95 | 0.44 | 0.41 | 0.14 | 0.55 | 0.00 | 0.14 | 0.41 | 274.97 | -3.26 |
| Amber | 200 | 10.00% | 143.80 | 3.40 | 0.00 | 22.20 | 1.46 | 0.00 | 27.60 | 0.32 | 0.59 | 0.30 | 0.50 | 0.00 | 0.20 | 0.00 | 200.36 | -4.74 |
| Green | 25 | 1.25% | 17.98 | 0.43 | 0.00 | 2.76 | 0.18 | 0.00 | 3.45 | 0.04 | 0.05 | 0.03 | 0.06 | 0.05 | 0.01 | 0.00 | 25.04 | -0.30 |

| Raw Materials | Batch Weight | Cost | SiO2 | Al2O3 | Co | CaO | MgO | Se | Na2O | K2O | Fe2O3 | TiO2 | S(total) | Cr2O3 | C | LOI | Total | COD |
|---|---|---|---|---|---|---|---|---|---|---|---|---|---|---|---|---|---|---|
| Sand, US Silica | 1010.0 | 20.20 | 1006.85 | 0.95 | 0.00 | 0.09 | 0.06 | 0.00 | 0.03 | 0.16 | 0.37 | 0.23 | 0.00 | 0.00 | 0.15 | 1.23 | 1010.13 | -3.59 |
| Limestone | 287.5 | 5.75 | 2.87 | 0.00 | 0.00 | 157.84 | 1.29 | 0.00 | 0.00 | 0.00 | 0.14 | 0.00 | 0.00 | 0.00 | 0.14 | 125.30 | 287.60 | -3.41 |
| Aplite, US Silica | 108.47 | 1.52 | 67.46 | 24.21 | 0.00 | 8.35 | 0.04 | 0.00 | 6.41 | 2.98 | 0.12 | 0.57 | 0.07 | 0.00 | 0.01 | 0.26 | 108.48 | -0.31 |
| Calumite | 0.0 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Salt Cake | 12.6 | 0.63 | 0.00 | 0.00 | 0.00 | 0.00 | 0.00 | 0.00 | 5.47 | 0.00 | 0.00 | 0.00 | 2.83 | 0.00 | 0.00 | 4.24 | 12.55 | 12.55 |
| Melite - 40 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Soda Ash, FMC | 309.0 | 12.98 | 0.00 | 0.00 | 0.00 | 0.00 | 0.00 | 0.00 | 180.44 | 0.00 | 0.00 | 0.00 | 0.00 | 0.00 | 0.00 | 128.53 | 308.97 | 0.00 |
| Carbocite #20 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Ferro Cobalt Frit | 9.738E-01 | 0.49 | 0.00 | 0.00 | 0.05 | 0.00 | 0.00 | 0.00 | 0.44 | 0.00 | 0.00 | 0.00 | 0.00 | 0.00 | 0.00 | 0.00 | 0.97 | 0.00 |
| Ferro Selenium Frit | 3.042E-01 | 15.21 | 15.21 | 0.00 | 0.00 | 0.00 | 0.00 | 0.61 | 14.60 | 0.00 | 0.00 | 0.00 | 0.00 | 0.00 | 0.00 | 0.00 | 30.42 | 0.00 |
| Niter, NaNO3 | 3.125E+00 | 0.31 | 0.00 | 0.00 | 0.00 | 0.00 | 0.00 | 0.00 | 1.14 | 0.00 | 0.00 | 0.00 | 0.00 | 0.00 | 0.00 | 1.99 | 3.12 | 13.05 |
| TOTALS | 2261.85 | 57.08 | 1452.38 | 33.66 | 0.05 | 219.78 | 5.04 | 0.61 | 277.63 | 3.94 | 1.69 | 1.26 | 4.00 | 0.05 | 0.66 | 261.97 | 2262.63 | 10.00 |

*** GLASS OXIDE FORMULA (Enter target glass composition) ***

| | Total | Glass=100 |
|---|---|---|
| Glass | 2000.00 | 100.00 |
| LOI | 262.63 | 13.13 |
| Total | 2262.63 | 113.13 |

| | Percent | SiO2 | Al2O3 | Co | CaO | MgO | Se | Na2O | K2O | Fe2O3 | TiO2 | S(total) | Cr2O3 | C | COD |
|---|---|---|---|---|---|---|---|---|---|---|---|---|---|---|---|
| Glass Oxides => | | 88.4% | | | | | | | | | | | | | | |
| Target Glass (default given) => | | 71.90% | 1.70% | 1.74E-05 | 11.10% | 0.25% | 3.04E-04 | 13.80% | 0.16% | 0.08% | 0.06% | 0.20% | 0.002% | 0.03% | 10 |
| Calculated Oxide Composition => | | 72.62% | 1.68% | 2.43E-05 | 10.99% | 0.25% | 3.04E-04 | 13.85% | 0.20% | 0.08% | 0.06% | 0.20% | 0.002% | 0.03% | 10.00 |

*** End of Main ***

Figure 15(c)
Clear(Flint) Glass Batch Formulations Using 3-Mix Cullet
Example Batches and Resultant Glass Properties

| Melt Identification | | | | | | |
|---|---|---|---|---|---|---|
| Cullet Scenario Name: Beer Belt Blend | | | | Cullet Color Percents | | |
| | | | | 55.0 Clear | | |
| Cullet Percentage | 25.0% | | | 40.0 Amber | | |
| | | | | 5.0 Green | | |

Batch Formulation                                                 Oxide Composition

| | Cullet | Total Batch | | | | |
|---|---|---|---|---|---|---|
| | weight, lbs. | Weight, lbs. | Weight, g | | Oxide | Wt. Pct. |
| *Cullet* | (by color) | (2000 lbs glass) | (1 kg glass) | Percent | | |
| Clear | 275 | | 137.5 | | $SiO_2$ | 72.6% |
| Amber | 200 | | 100 | | $Al_2O_3$ | 1.7% |
| Green | 25 | | 12.5 | | CaO | 11.0% |
| TOTAL | | 500 | 250 | 22.10% | MgO | 0.3% |
| | | | | | $Na_2O$ | 13.9% |
| *Virgin Raw Materials* | | | | | $K_2O$ | 0.2% |
| Sand, US Silica | | 1010.0 | 505.0 | 44.64% | $Fe_2O_3$ | 0.084% |
| Limestone | | 287.5 | 143.7 | 12.70% | $TiO_2$ | 0.063% |
| Aplite, US Silica | | 108.47 | 54.2 | 4.79% | S(total) | 0.200% |
| Calumite | | 0.0 | 0.0 | 0.00% | $Cr_2O_3$ | 0.002% |
| Salt Cake | | 12.6 | 6.3 | 0.55% | | |
| Melite - 40 | | 0.00 | 0.0 | 0.00% | Total | 100.0% |
| Soda Ash | | 309.0 | 154.5 | 13.66% | | |
| Carbocite #20 | | 0.000E+00 | 0.000E+00 | 0.00% | | |
| Ferro Cobalt Frit | | 9.738E-01 | 4.869E-01 | 4.304E-04 | | |
| Ferro Selenium Frit | | 3.042E+01 | 1.521E+01 | 1.344E-02 | | |
| Niter | | 3.125E+00 | 1.562E+00 | 1.383E-03 | | |
| TOTALS | | 2258.8 | 1131.0 | 99.97% | | |
| | | | | | | |
| After Melting: | | | | | | |
| Glass | | 2000.0 | 1000.0 | | | |
| LOI | | 262.6 | 131.3 | | | |
| Total | | 2262.6 | 1131.3 | | | |

Glass Color and Redox Properties

| Color (amber, green, clear) | | Clear |
|---|---|---|
| Thickness, mm | | 3.2 |
| | | |
| Neutral Grey Transmission | | 71.1 |
| | | |
| Chemical Oxygen Demand | | 10.00 |

End of Summary

Figure 15(d)
Clear(Flint) Glass Batch Formulations Using 3-Mix Cullet
Example Batches and Resultant Glass Properties

| Melt Identification | | |
|---|---|---|
| Cullet Scenario Name: Beer Belt Blend | | Cullet Color Percents |
| Cullet Percentage | 50.0% | 55.0 Clear<br>40.0 Amber<br>5.0 Green |

Batch Formulation — Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1 kg glass) | Percent | | |
| Clear | 550 | | 275 | | $SiO_2$ | 72.3% |
| Amber | 400 | | 200 | | $Al_2O_3$ | 1.7% |
| Green | 50 | | 25 | | CaO | 11.0% |
| TOTAL | | 1000 | 500 | 46.10% | MgO | 0.4% |
| | | | | | $Na_2O$ | 13.9% |
| *Virgin Raw Materials* | | | | | $K_2O$ | 0.2% |
| Sand, US Silica | | 659.7 | 329.9 | 30.41% | $Fe_2O_3$ | 0.126% |
| Limestone | | 190.3 | 95.2 | 8.77% | $TiO_2$ | 0.072% |
| Aplite, US Silica | | 71.86 | 35.9 | 3.31% | S(total) | 0.200% |
| Calumite | | 0.0 | 0.0 | 0.00% | $Cr_2O_3$ | 0.005% |
| Salt Cake | | 7.8 | 3.9 | 0.36% | | |
| Melite - 40 | | 0.00 | 0.0 | 0.00% | Total | 100.0% |
| Soda Ash | | 185.7 | 92.9 | 8.56% | | |
| Carbocite #20 | | 0.000E+00 | 0.000E+00 | 0.00% | | |
| Ferro Cobalt Frit | | 1.232E+00 | 6.158E-01 | 5.678E-04 | | |
| Ferro Selenium Frit | | 4.589E+01 | 2.295E+01 | 2.116E-02 | | |
| Niter | | 5.655E+00 | 2.828E+00 | 2.615E-03 | | |
| TOTALS | | 2162.6 | 1084.1 | 99.96% | | |
| | | | | | | |
| After Melting: | | | | | | |
| Glass | | 2000.0 | 1000.0 | | | |
| LOI | | 169.2 | 84.6 | | | |
| Total | | 2169.2 | 1084.6 | | | |

Glass Color and Redox Properties

| Color (amber, green, clear) | Clear |
|---|---|
| Thickness, mm | 3.2 |
| Neutral Grey Transmission | 62.4 |
| Chemical Oxygen Demand | 10.00 |

End of Summary

Figure 16(a)
Clear(Flint) Glass Batch Formulations Using 3-Mix Cullet
Example Batches and Resultant Glass Properties

| Melt Identification | | |
|---|---|---|
| Cullet Scenario Name: USA Production | | Cullet Color Percents |
| Cullet Percentage | 25.0% | 58.0 Clear<br>32.0 Amber<br>10.0 Green |

Batch Formulation — Oxide Composition

| | Cullet | Total Batch | | | Oxide | Wt. Pct. |
|---|---|---|---|---|---|---|
| *Cullet* | weight, lbs.<br>(by color) | Weight, lbs.<br>(2000 lbs glass) | Weight, g<br>(1 kg glass) | Percent | | |
| Clear | 290 | | 145 | | SiO2 | 72.6% |
| Amber | 160 | | 80 | | Al2O3 | 1.7% |
| Green | 50 | | 25 | | CaO | 11.2% |
| TOTAL | | 500 | 250 | 22.07% | MgO | 0.3% |
| | | | | | Na2O | 13.7% |
| *Virgin Raw Materials* | | | | | K2O | 0.2% |
| Sand, US Silica | | 1010.8 | 505.4 | 44.62% | Fe2O3 | 0.082% |
| Limestone | | 295.8 | 147.9 | 13.06% | TiO2 | 0.062% |
| Aplite, US Silica | | 108.53 | 54.3 | 4.79% | S(total) | 0.200% |
| Calumite | | 0.0 | 0.0 | 0.00% | Cr2O3 | 0.005% |
| Salt Cake | | 12.7 | 6.3 | 0.56% | | |
| Melite - 40 | | 0.00 | 0.0 | 0.00% | Total | 100.0% |
| Soda Ash | | 301.5 | 150.8 | 13.31% | | |
| Carbocite #20 | | 1.761E-01 | 8.805E-02 | 0.01% | | |
| Ferro Cobalt Frit | | 6.991E-01 | 3.496E-01 | 3.086E-04 | | |
| Ferro Selenium Frit | | 3.059E+01 | 1.529E+01 | 1.350E-02 | | |
| Niter | | 3.791E+00 | 1.896E+00 | 1.677E-03 | | |
| TOTALS | | 2260.9 | 1132.3 | 99.97% | | |
| | | | | | | |
| After Melting: | | | | | | |
| Glass | | 2001.5 | 1000.8 | | | |
| LOI | | 263.8 | 131.9 | | | |
| Total | | 2265.3 | 1132.7 | | | |

Glass Color and Redox Properties

| Color (amber, green, clear) | Clear |
|---|---|
| Thickness, mm | 3.2 |
| Neutral Grey Transmission | 71.0 |
| Chemical Oxygen Demand | 10.00 |

End of Summary

Figure 16(b)
Clear(Flint) Glass Batch Formulations Using 3-Mix Cullet
Example Batches and Resultant Glass Properties

Melt Identification

Cullet Scenario Name: USA Production

Cullet Percentage  50.0%

| Cullet Color Percents |
|---|
| 58.0 Clear |
| 32.0 Amber |
| 10.0 Green |

Batch Formulation  Oxide Composition

| | Cullet | Total Batch | | | Oxide | Wt. Pct. |
|---|---|---|---|---|---|---|
| | weight, lbs. | Weight, lbs. | Weight, g | | | |
| *Cullet* | (by color) | (2000 lbs glass) | (1 kg glass) | Percent | | |
| Clear | 580 | | 290 | | $SiO_2$ | 72.3% |
| Amber | 320 | | 160 | | $Al_2O_3$ | 1.7% |
| Green | 100 | | 50 | | CaO | 11.0% |
| TOTAL | | 1000 | 500 | 46.10% | MgO | 0.4% |
| | | | | | $Na_2O$ | 13.9% |
| *Virgin Raw Materials* | | | | | $K_2O$ | 0.2% |
| Sand, US Silica | | 659.7 | 329.8 | 30.41% | $Fe_2O_3$ | 0.122% |
| Limestone | | 190.3 | 95.2 | 8.78% | $TiO_2$ | 0.070% |
| Aplite, US Silica | | 71.86 | 35.9 | 3.31% | S(total) | 0.200% |
| Calumite | | 0.0 | 0.0 | 0.00% | $Cr_2O_3$ | 0.010% |
| Salt Cake | | 8.0 | 4.0 | 0.37% | | |
| Melite - 40 | | 0.00 | 0.0 | 0.00% | Total | 100.0% |
| Soda Ash | | 185.6 | 92.8 | 8.56% | | |
| Carbocite #20 | | 0.000E+00 | 0.000E+00 | 0.00% | | |
| Ferro Cobalt Frit | | 1.300E+00 | 6.500E-01 | 5.994E-04 | | |
| Ferro Selenium Frit | | 4.605E+01 | 2.302E+01 | 2.123E-02 | | |
| Niter | | 5.386E+00 | 2.693E+00 | 2.490E-03 | | |
| TOTALS | | 2162.7 | 1084.1 | 99.96% | | |
| | | | | | | |
| After Melting: | | | | | | |
| Glass | | 2000.0 | 1000.0 | | | |
| LOI | | 169.0 | 84.5 | | | |
| Total | | 2169.0 | 1084.5 | | | |

Glass Color and Redox Properties

| Color (amber, green, clear) | Clear |
|---|---|
| Thickness, mm | 3.2 |
| Neutral Grey Transmission | 62.3 |
| Chemical Oxygen Demand | 10.00 |

End of Summary

METHOD OF RECYCLING BATCHES OF MIXED COLOR CULLET INTO AMBER, GREEN, OR FLINT GLASS WITH SELECTED PROPERTIES

CROSS-REFERENCE TO RELATED APPLICATIONS

This application is a continuation of U.S. Ser. No. 09/455,644 filed Dec. 7, 1999, which is a divisional of U.S. Ser. No. 09/057,763 filed Apr. 9, 1998, now U.S. Pat. No. 6,230,521 both of which are incorporated herein by reference.

BACKGROUND OF THE INVENTION

1. Field of the Invention

The invention relates to the field of glass recycling. The invention more particularly relates to an automated method for recycling mixed colored cullet glass (i.e., broken pieces of glass of mixed colors and types) into new glass products. According to a preferred aspect of the invention, a computer controlled process is provided whereby a recycler identifies the virgin glass raw materials, the desired target glass properties, the composition of a batch of mixed colored cullet, and the quantity of cullet to be used in the glass melt, and the computer program determines the proper amounts of raw materials to add to the batch of mixed colored cullet so that recycled glass is produced having the desired coloring oxides, redox agents, and glass structural oxides in the proper proportion. The recycled glass is then used to make glass products such as beer bottles.

2. Description of the Prior Art

Glass recycling involves collecting used, post-consumer glass and reusing it as a raw material for the manufacture of new glass products. A main repository of recoverable glass is glass containers such as beverage bottles and containers for other products. Bulk recycled post-consumer glass suitable for melting into recycled glass articles is known as cullet. The glass cullet for recycling is generally provided in the form of small pieces of glass.

Recycled containers comprise different colors, especially amber and green, and also colorless or flint glass. There also may be different types of glass in the respective containers, although soda-lime-silica glass, which primarily contains oxides of sodium, calcium and silicon, is the most prevalent. Other waste glass, e.g., off-quality material and scrap from the manufacture of glass products, may also be re-used in the form of comminuted or ground glass cullet.

Approximately ten percent (10%) of municipal refuse is glass, most of which is in the form of discarded containers from beverages, food products and the like. To encourage recycling and minimize waste, there are certain government legislated guidelines to the effect that new glass products should contain a proportion of recycled glass. There is thus a market for cullet that can be re-used readily. Unfortunately, this normally requires that the glass be sorted by color.

Municipal refuse glass is typically collected at the street, processed at a central location and ground into small particles to provide cullet for use in the manufacture of glass products. Processing can involve, for example, color sorting by hand or by optical techniques and removal of non-glass contaminants by hand, optical techniques, magnetic, eddy current and metal detecting separation techniques. These techniques are not wholly effective for the separation and color sorting of all of the glass. In sorting, for example, it is possible manually, or mechanically by using a color sensing diverter mechanism, to sort glass by color. However, much of the glass is broken in handling and cannot readily be sorted as whole containers, and sorting of smaller pieces is more difficult. A by-product of glass recycling, even when an attempt is made to sort the glass by color, is a quantity of mixed colored pieces.

The color distribution of the glass in post-consumer solid municipal waste, and accordingly, in typical mixed color cullet, varies regionally. A typical color distribution is approximately 65% flint (colorless), 20% amber, and 15% green. To date, mixed colored cullet has had only limited commercial use, and may be used as an aggregate in paving material, landfill cover, or some similar use, but often is discarded in landfills. The mixed colored material is substantially less valuable than color sorted cullet.

Decolorizing techniques are known in the production of flint glass, especially to remove the tint due to iron impurities, which impurities tend to impart a bluish or greenish hue to "colorless" glass. In the manufacture of colorless glass, particularly soda-lime-silica flint glasses, the presence of iron as an impurity in the raw materials has been a serious problem. The presence of ferrous iron ($Fe^{+2}$) tends to cause a bluish or blue-green discoloration in the finished glass in addition to decreasing its overall brightness. The economics of glass manufacture are such that it is difficult to provide low cost raw materials free from these iron impurities, and most significant deposits of sand and limestone contain at least trace amounts of various iron salts and oxides.

When the raw materials are melted in the glass batch at temperatures of about 2,600 to 2,900 F (about 1,400 to 1,600 C), significant amounts of iron present are converted to the ferrous ($Fe^{+2}$) state under the influence of the prevailing equilibrium conditions. Decolorizers and oxidizers can be added to the glass batch in an attempt to oxidize the ferrous ($Fe^{+2}$) iron, thereby forming ferric ($Fe^{+3}$) iron, to minimize this glass coloration. Ferric iron ($Fe^{+3}$) is a relatively much weaker colorant than ferrous iron.

In U.S. Pat. No. 2,929,675 (Wranau, et al.), a method is disclosed for spinning glass fibers using a fluid molten glass, which glass is optically enhanced by decolorizing the glass to make it more transparent or translucent, so that infra-red rays of the radiant heat supply more readily pass through the glass for heating the spinnerette. In the Wranau method, glass which is naturally greenish is decolorized by the addition of effective decolorizing amounts of such materials as selenium oxide, manganese peroxide, copper oxide or dispersed gold to the molten glass.

In U.S. Pat. No. 2,955,948 (Silverman), a glass decolorizing method is disclosed which continuously produces molten color-controlled homogeneous glass. In the Silverman method, flint (colorless) and other container glass is decolorized by addition to the molten glass of a selenium-enriched frit as a decolorizing agent, as opposed to selenium in its free state mixed with virgin batch raw materials. This is considered to better retain the selenium in the finished goods without vapor loss thereof. Silverman discloses that various commonly used materials for decolorizing flint glass have been tried to eliminate selenium vapor losses without success, such as various selenium compounds, e.g., sodium and barium selenates and selenides, as well as arsenic, by reducing the iron oxide inherently present therein. Silverman discloses that the decolorizing agent preferably comprises frit compositions containing the essential decolorizing agent selenium in its $Se^{+4}$ valence state, and also may contain niter and arsenic. In Silverman's method, the decolorizing agent of selenium-enriched frit is added to the molten flint glass and dispersed therein in order to decolorize the glass.

In U.S. Pat. No. 3,482,955 (Monks), a method is disclosed for decolorizing the ferrous ($Fe^{+2}$) oxide content of soda-lime glass which naturally contains up to about 0.1% by weight of ferrous oxide. The method of Monks continuously produces decolorized homogeneous glass using a manganese-enriched frit glass as the decolorizing agent. Monks, in particular, provides a method of decolorizing soda-lime glass containing iron as the impurity by utilizing a decolorizing frit glass containing manganese that produces no undesirable coloration of its own and adding the decolorizing frit glass to the molten base glass. Monks teaches that decolorizing frit glass preferably comprises oxidized manganese in the $Mn^{+3}$ state ($Mn_2O_3$) and in the $Mn^{+2}$ state (MnO), which acts as an oxidizing agent to oxidize ferrous iron to ferric iron in soda-lime glass.

Decolorizing to minimize the tint caused by trace impurities such as a small proportion of ferrous iron is a less severe problem than decolorizing or offsetting recycled glass that has been heavily tinted by the addition of tint producing compounds, such as chromium green found in high concentrations in green glass. A sufficient treatment with decolorizing compositions may be difficult to achieve without also affecting the clarity of the glass or causing other quality and manufacturing problems.

In co-assigned related U.S. Pat. No. 5,718,737, a process was described for re-using mixed colored glass cullet to make new and useful glass products. As described more fully below, in the described process one or more of the colors in the mixed colored cullet is selectively colorized and/or decolorized to render it useful in the manufacture of glass products in one of the other colors. In particular, a batch of mixed color cullet such as recycled municipal waste glass containing a mixture of green, amber and flint (colorless) glass, was selectively decolorized and/or colorized to a desired color with desired properties. For example, the mixed colored cullet was converted to recycled amber colored glass for the manufacture of amber glass containers, such as beer and other beverage bottles, by selectively decolorizing for green and colorizing to achieve an amber tint, thereby minimizing any adverse effect on the appearance of the container due to the relatively dark amber color.

It is desired to develop a technique for automating this process for commercial glass production whereby different batches of broken glass in mixed colors may be readily rehabilitated to provide a material that is substantially as useful for the production of recycled glass containers as sorted amber, green, or flint glass. In particular, it is desired to expand upon the technique described in U.S. Pat. No. 5,718,737 by automating the recycling process and adapting it to conventional commercial glass production processes by specifying the amount of raw materials needed to create glass products with desired properties using different batches of mixed colored cullet. The present invention has been designed to meet this need in the art.

SUMMARY OF THE INVENTION

An automated method for recycling mixed colored cullet glass (i.e., broken pieces of glass of mixed colors and types) into new glass products in accordance with the invention meets the above-mentioned needs in the art by providing a computer controlled process which identifies the virgin glass raw materials, the desired target glass properties, the composition of a batch of mixed colored cullet, and the quantity of cullet to be used in the glass melt, and the computer controlled process then automatically determines the proper amounts of raw materials to add to the batch of mixed colored cullet so that recycled glass is produced having the desired coloring oxides, redox agents, and glass structural oxides in the proper proportion. The recycled glass is then used to make glass products such as beer bottles.

In particular, the present invention relates to a method of calculating the amount of raw materials for different mixed cullet compositions, different percentages of mixed cullet in the glass batch, and different target glass compositions. Key indicator parameters for the different glass colors are calculated and used to calculate the batch composition to be formed from a particular cullet starting material. The results are then printed out using, e.g., Microsoft Excel, and used in conventional commercial glass production processes.

A preferred embodiment of the method of creating recycled glass products of a particular color from mixed color glass cullet having glass of at least two different colors in accordance with the invention preferably comprises the steps of:

selecting virgin glass raw materials and determining weight percentages of respective components of the virgin glass raw materials;

determining weight percentages of at least the respective components of the mixed color glass cullet;

selecting the particular color of the recycled glass products;

specifying transmission properties of the recycled glass products of the particular color;

determining how much of the mixed color glass cullet, by weight percent, is to be melted as a fraction of a recycled finished glass from which the recycled glass products are to be created;

specifying percentage composition of at least two of amber, green, and flint glass in the mixed color glass cullet;

calculating glass coloring oxide agent levels and key glass indicator parameters of glass of the particular color with the specified transmission properties;

calculating a composition of the recycled finished glass, the composition including weight percentages of the raw materials, the mixed color glass cullet, the key glass indicator parameters, and the glass coloring oxide agent levels; and creating recycled glass products from the calculated composition.

In accordance with the invention, if the particular color is amber, the step of specifying transmission properties of the recycled glass products comprises the steps of specifying a thickness of a finished glass product made from the calculated composition and specifying at least two of: an optical transmission of the finished glass product at 550 nm ($T_{550}$), an optical transmission of the finished glass product at 650 nm ($T_{650}$), and a redness ratio ($T_{650}/T_{550}$) of the finished glass product. For amber glass, the key glass indicator parameters comprise at least one of iron concentration, sulfur concentration, chrome concentration, copper concentration, and oxidation state. On the other hand, if the particular color is green, the step of specifying transmission properties of the recycled glass products comprises the steps of specifying a thickness of a finished glass product made from the calculated composition and specifying levels of chromium and iron of the finished glass product. For green glass, the key glass indicator parameters comprise at least one of chromium concentration and iron concentration. However, if the particular color is clear, the step of specifying transmission properties of the recycled glass products comprises either the step of determining the best possible neutral density transmission for a finished glass product for the specified amount of mixed color glass cullet in the finished glass product, or the step of maximizing the amount of mixed color glass cullet used in the finished glass product for the transmission properties specified in the transmission properties specifying step. For clear glass, the key glass indicator parameters comprise at least one of chromium concentration, iron concentration, selenium concentration, cobalt concentration, and oxidation state.

In accordance with the preferred embodiment of the invention, the step of calculating the composition of the recycled finished glass is performed by a computer program loaded on a host processor, and comprises the step of calculating the proper amounts of the respective components so that the proper coloring oxides, redox agents, and glass structural oxides are present in the proper proportion in the finished glass products in accordance with the following linear equation:

$$M_{m \times n} X_n = B_m$$

where:

M is a matrix of dimension m by n, where n is a number of the components from which the recycled finished glass is to be made and m is a number of composition constraints including the key glass indicator parameters plus essential oxide concentrations for the finished glass products;

X is a row vector of dimension n that defines the weight percent of each component in the recycled finished glass; and B is a column vector of dimension m that contains target values of the composition constraints.

Since this linear equation may have multiple solutions, the step of calculating the composition of the recycled finished glass preferably comprises the additional step of selecting solutions of the linear equation which minimize costs of the components in the recycled finished glass if the particular color is amber or green. For example, if the particular color is amber, the components may include compositions of clear, amber, and green cullets plus a predetermined number of conventional glass raw materials, and the composition constraints may include concentrations of $SiO_2$, $Al_2O_3$, CaO, and $Na_2O$ from the virgin glass, the concentrations of the coloring oxides of chrome, iron, sulfur, and copper, and a chemical oxygen demand value. On the other hand, if the particular color is clear, then the linear equation is preferably solved by selecting the solutions of the linear equation which minimize iron levels in the recycled finished glass.

Preferably, the calculated composition (by weight percentages of the recycled finished glass for a predetermined amount of the finished glass products) and a chemical composition of the recycled finished glass, as well as the transmission properties of the finished glass products are printed.

The scope of the invention also includes the finished glass products made from the combined three mix and virgin glass composition calculated using the techniques of the invention. Preferably, the finished glass product is a glass bottle, such as an amber or green beer bottle.

The scope of the invention also includes a program storage device readable by a processor and storing thereon a program of instructions executable by the processor during the process of creating recycled glass products of a particular color from mixed color glass cullet having glass of at least two different colors. In accordance with the invention, the program of instructions causes the processor to accept as inputs a designation of virgin glass raw materials, a designation of the particular color of the recycled glass products, a designation of desired transmission properties of the recycled glass products of the particular color, a designation of how much of the mixed color glass cullet, by weight percent, is to be melted as a fraction of a recycled finished glass from which the recycled glass products are to be created, and a designation of a percentage composition of at least two of amber, green, and flint glass in the mixed color glass cullet, and causes the processor to determine from the inputs the weight percentages of respective components of the virgin glass raw materials, weight percentages of at least the respective components of the mixed color glass cullet, glass coloring oxide agent levels and key glass indicator parameters of glass of the particular color with the specified transmission properties, and a composition of the recycled finished glass, the program of instructions further causing the processor to output an indication of the composition for use in the process of creating recycled glass products of a particular color from mixed color glass cullet, the composition including weight percentages of the raw materials, the mixed color glass cullet, the key glass indicator parameters, and the glass coloring oxide agent levels. The composition is then printed for use as a "recipe" in creating finished glass products, such as glass beer bottles, from a glass batch including mixed color cullet.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings of which:

FIG. 1 illustrates the inventive technique for determining the composition of glass batches including post-consumer mixed color glass cullet.

FIGS. 2(a) and 2(b) together illustrate a spreadsheet of a glass oxide calculation model from the batch formula for the creation of recycled amber glass containers from an amber melt including 35% recycled mixed color cullet using the techniques of the invention.

FIG. 2(c) illustrates the glass batch formulations for the creation of recycled green glass containers from three mix cullet typical of that found on the East and West Coast where substantial imported beer and wine consumption occurs, where the three mix cullet is 35% of the total glass.

FIG. 3 illustrates the redness ratio and measured visible transmission levels for amber, green and clear glasses from different glass producers.

FIG. 4 illustrates the ratio of clear (flint), amber, and green glass for different customer glass use patterns and the products available in regional markets.

FIG. 5 illustrates the extinction coefficients for the container glass specimens of FIG. 3 as well as the average extinction coefficients and average transmission normalized through 3.18 mm thick glass for the major amber and green glass manufacturers in the United States.

FIGS. 6(a) and 6(b) respectively illustrate the glass batch formulations for the creation of recycled amber glass containers from a three-mix where the cullet is 50% and 75% of the total glass, respectively.

FIGS. 7(a)–7(c) respectively illustrate the glass batch formulations for the creation of recycled amber glass containers from three-mix where the cullet is 25%, 50%, and 75% of the total glass, respectively, which is typical of domestic glass production.

FIGS. 8(a)–8(c) respectively illustrate the glass batch formulations for the creation of recycled amber glass containers from the standard U.S. glass production (⅓ clear glass removed) three-mix where the cullet is 25%, 50%, and 75% of the total glass, respectively.

FIGS. 9(a)–9(c) respectively illustrate the glass batch formulations for the creation of recycled amber glass containers from the standard U.S. glass production (⅔ clear glass removed) three-mix where the cullet is 25%, 50%, and 75% of the total glass, respectively.

FIGS. 10(a)–10(c) respectively illustrate the glass batch formulations for the creation of recycled amber glass containers from the trend to amber three-mix where the cullet is 25%, 50%, and 75% of the total glass, respectively.

FIGS. 11(a)–11(c) respectively illustrate the glass batch formulations for the creation of recycled amber glass containers from the Middle America Beer Belt three-mix where the cullet is 25%, 50%, and 75% of the total glass, respectively.

FIGS. 12(a) and 12(b) together illustrate a spreadsheet of a glass oxide calculation model from the batch formula for the creation of recycled green glass containers from a green melt including 35% recycled mixed color cullet using the techniques of the invention.

FIGS. 12(c) and 12(d) respectively illustrate the glass batch formulations for the creation of recycled green glass containers from three mix cullet typical of that found on the East and West Coast where the cullet is 35% and 70% of the total glass, respectively.

FIGS. 13(a)–13(c) respectively illustrate the glass batch formulations for the creation of recycled green glass containers from the standard U.S. glass production three-mix where the cullet is 25%, 50%, and 75% of the total glass, respectively.

FIGS. 14(a)–14(c) respectively illustrate the glass batch formulations for the creation of recycled green glass containers from the beer belt blend three-mix where the cullet is 25%, 50%, and 75% of the total glass, respectively.

FIGS. 15(a) and 15(b) together illustrate a spreadsheet of a glass oxide calculation model from the batch formula for the creation of recycled clear (flint) glass containers from the beer belt blend three-mix, where the cullet is 25% of the total glass, using the techniques of the invention.

FIGS. 15(c) and 15(d) illustrate the glass batch formulations for the creation of recycled clear (flint) glass containers from the beer belt blend three-mix where the cullet is 25% and 50% of the total glass, respectively.

FIGS. 16(a) and 16(b) respectively illustrate the glass batch formulations for the creation of recycled clear (flint) glass containers from the USA production three-mix where the cullet is 25% and 50% of the total glass, respectively.

DETAILED DESCRIPTION OF PRESENTLY PREFERRED EMBODIMENTS

A method of recycling mixed color cullet with the above-mentioned beneficial features in accordance with a presently preferred exemplary embodiment of the invention will be described below with reference to FIGS. 1–16. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

I. Mixed Cullet Recycling Method of U.S. Pat. No. 5,718,737

A quantity of mixed colored glass cullet may be manually recycled into new glass products using the technique described in U.S. Pat. No. 5,718,737. As described therein, the mixed colored glass cullet is generally reclaimed, post-consumer glass, although the glass producer's waste cullet can also be mixed therewith, and typically comprises a mixture of green glass, amber glass and flint (colorless) glass. The mixed colored cullet is primarily made of soda-lime-silica glass (otherwise referred to as "soda-lime glass") and is typically provided in bulk in the form of a plurality of broken pieces or particles produced by crushing or grinding glass containers, the particles typically sized less than 6 mm in diameter, such that the cullet can be readily poured or otherwise handled and melted. Generally, at least one color may be selectively removed, neutralized, or converted in a specified batch of mixed color glass cullet by selective physical and/or chemical decolorizing, at which time, the mixed color glass cullet absent such at least one color is recovered for use in the production of new glass products.

Amber colored glass may be produced from the mixed color glass cullet by selectively decolorizing the green colorant in the mixed cullet. In particular, the green glass particles which inherently contain chromium oxide as the green colorant, and which also may contain iron impurities, can be selectively decolorized in the mixed colored batch to remove excessive green which lowers the desired redness ratio or reddish hue in amber glass used to manufacture new containers, such as amber beer bottles. The reddish-brown hue of amber colored glass from mixed color cullet is controlled by regulating the amounts of iron, carbon and sulfur in the mix to impart the desired reddish-brown amber color. A similar technique may be used to produce recycled green or flint colored glass bottles and the like.

The mixed color glass cullet is optionally decolorized as to at least one color, by addition to mixed color glass an effective amount of decolorizing agent(s) as provided hereinafter, for the at least one color to be decolorized. The method includes the step of further colorizing the mixed colored cullet as to at least one remaining color, by addition to the mixed colored glass, an effective amount of colorizing agent(s) as provided hereinafter, to enhance the remaining color. Preferably, a predetermined amount of mixed colored cullet glass is admixed with a virgin batch of glass containing conventional glass raw materials in the remaining color as well as decolorizing agent(s) and colorizing agent(s) to compensate for the mixed colored cullet to produce new glass products containing a certain percentage of recycled mixed colored cullet. This is particularly effective for making amber glass containers and the like from mixed color cullet.

Conventional glass raw materials, such as those for amber, green, or flint soda-lime-silicate glasses, and glass making equipment, such as glass melting furnaces, lehrs, forming equipment and the like, can be used with the method of the invention. For a description of glass raw materials, glass manufacture and processing techniques, reference can be made, inter alia, to S. R. Scholes, Ph.D., *Modern Glass Practice*, CBI Publishing Co., Inc. (1975) and Kirk-Othmer, *Concise Encyclopedia of Chemical Technology*, John Wiley & Sons, Inc. (1985), pp. 560–565, the disclosures of which are hereby incorporated in their entireties.

Amber colored glass used for beverage bottles can be produced from the post consumer (recycled) cullet. In such a method, a quantity of post consumer (recycled) cullet is intimately mixed together with a virgin batch of conventional glass raw materials used for making amber colored glass, preferably carbon-sulfur amber glass. The minimum amount of mixed colored cullet in the batch may be affected by government regulations. It is required by some state governments to include at least about −10% or greater, while some state governments require at least about 35% or greater, and, by the year 2000, will require between about 35% and 50% by weight post consumer (recycled) cullet in the glass. It is preferred that the mixed colored cullet is introduced on top of a mixed virgin glass in the glass melting furnace, typically operated at a temperature of 2,600 to 2,900 F (about 1,400 to 1,600 C), to reduce the tendency of the cullet to cause foaming and frothing of the molten glass and resultant processing problems.

The virgin glass raw materials for amber colored glass, known to be capable of yielding glass-forming oxides, can include effective amounts of major constituents, e.g., sand, limestone, soda ash, feldspar, or the like, and minor constituents, e.g., salt cake, gypsum, carbocite, graphite, iron pyrite, calumite, or the like.

While the precise mechanism is not well understood, the reddish-brown coloration of carbon-sulfur amber colored glass is believed to be attributed to its sulfate (e.g., soda cake and gypsum), carbon (e.g., carbocite, graphite and carbon black) and iron (e.g., iron oxide and iron pyrite) contents. It is believed that amber glass formation involves the colorizing reactions of the alkali sulfates with reducing agents, such as carbon, to form alkali sulfites, elemental sulfur and sulfides, as well as alkali polysulfides and sulfoferrites, which compounds are all believed to play a part in the amber coloring.

Amber container glasses absorb light in the biologically active region of 450 NM and thereby protect the container contents from chemically active ultraviolet radiation. Amber glass is produced under strong reducing conditions and typically has a redox number of about −40 to −70 and a redness ratio of in the range of 1.5–2.0.

The level of reduction present in a glass melting furnace is represented by the redox number, RN. The redox number is given, per ton of glass, as the pounds of salt cake ($Na_2SO_4$) oxidizer equivalent in excess of that required to balance the following stoichiometric equations.

$$C+2Na_2SO_4 \; 2Na_2O(glass)+CO_2+2SO_2$$

(Note that the Mass Ratio of salt cake ($Na_2SO_4$) to carbon (C) in the balanced equation=284/12=23.7)

$$5C+4NaNO_3 \; 2Na_2O(glass)+5CO_2+2N_2$$

(Note that the Mass Ratio of niter ($NaNO_3$) to carbon (C) is =340/60=5.667, thus, the salt cake/niter ratio can be calculated by 23.7/5.667=4.182)

Hence, a positive redox number indicates oxidizing conditions while a negative redox number reflects reducing conditions.

The redox number can be calculated from the following formula for batches and glasses where all oxidizing and reducing agents are expressed in terms of salt cake, niter, and carbon equivalents:

$$RN=Ss+Nn-Cc$$

where:
S=salt cake, lbs per ton of glass
C=carbon, lbs per ton of glass
N=niter, lbs per ton of glass
and
s=salt cake mass ratio to salt cake=1
c=salt cake to carbon mass ratio=23.7
n=salt cake to niter mass ratio=4.182

The composition of a non-limiting, purely representative example of an amber container glass (shown in weight percentages) is provided in Table 1.

TABLE I

| Composition of Amber Colored Glass | |
|---|---|
| Oxide | % (Wt.) |
| $SiO_2$ | 71–73 |
| $Al_2O_3$ | 0.1–0.5 |
| $Fe_2O_3$ | 0.2–0.5 |
| CaO | 7–9 |
| MgO | 0.1–2 |
| $Na_2O$ | 13–15 |
| $K_2O$ | 0–1 |
| MnO | 0–1 |
| $SO_3$ | 0–.5 |

The mixed colored cullet may be selectively melted into the virgin glass, forming a homogenous mixture. The green glass contained in the mixed colored cullet, which has relatively high chromium oxide content and which also may contain iron impurities, is decolorized by the addition of an effective amount of a decolorizing agent to the molten mixed colored cullet. The decolorizing agent can be a chemical or physical decolorizing agent, or both.

In physical decolorizing, complementary colors are added to the green cullet to offset or neutralize the color green. Preferred physical decolorizing agents include elemental or compounds of selenium (red), manganese (red), cobalt (blue), nickel, and/or selenides. A limitation of color blending, however, is that the glass may be imparted with a gray (smoky) hue in offsetting the greenness in this manner, which may render the glass less water-white. For a typical mixed colored cullet comprising about 56% by weight flint (colorless), 22.5% by weight amber, and 21.5% by weight green glass, it is preferred to add from about 0.001 to 0.01% by weight of selenium or comparable decolorizing agent per 100% by weight mixed color cullet, most preferably between about 0.005 to 0.01% by weight.

Instead of or in addition to physical decolorizing, chemical decolorizing can be effected. Preferred chemical decolorizing agents or oxidizing agents which can be added in effective amounts to the mixed color cullet to oxidize trace amounts of ferrous (green) to ferric iron include oxides of zinc, cerium, and arsenic, and also can include oxidized virgin glass materials. For a typical mixed colored cullet comprising about 56% by weight flint (colorless), 22.5% by weight amber, and 21.5% by weight green glass, it is preferred to add from about 0.001 to 0.01% by weight of chemical decolorizing agent per 100% by weight mixed colored cullet, most preferably between about 0.005 to 0.05% by weight.

The decolorized or color neutralized green colored cullet and the flint cullet that remain can be color enhanced to amber by adding effective amounts of typical colorizing agents for amber glass production. Preferred colorizing agents include iron pyrite, salt cake (sodium sulfate), sodium sulfite, sodium sulphide, carbon (typically in the form of carbocite or graphite), and slag (typically in the form of calumite), which are used to impart a reddish-brown color. For a typical mixed colored cullet comprising about 56% by weight flint (colorless), 22.5% by weight amber, and 21.5% by weight green glass, it is preferred to add from about 0.25 to 0.50% by weight of colorizing agent per 100% by weight mixed colored cullet, most preferably between about 0.30 to 0.40% by weight.

The molten mixture of mixed colored cullet converted to amber color and virgin amber glass can be fined as is well known by the addition of, e.g., salt cake, to minimize gas bubbles therein. After fining, the glass can be directed to a glass blowing machine or other glass forming machine in the same manner as conventionally produced glass, e.g., in a bottle glass blowing machine for forming amber colored beer bottles. After forming, the glass can be annealed in a known manner, e.g., in a lehr, to remove internal glass stresses.

This technique is not limited to the production of amber colored glass from mixed colored cullet. It is also directed to the production of flint or green glass from mixed colored cullet as well. For flint glass, a virgin batch is mixed with chemical decolorizing agents, such as, oxides of cerium and zinc to chemically oxidize iron impurities and may also be mixed with physical decolorizing agents having complementary colors, such as elemental or compounds of selenium and cobalt.

This method can be better understood from the following purely exemplary and non-limiting example.

EXAMPLE

Conversion of Mixed Broken Colored Cullet to Amber Colored Glass

A batch of mixed colored cullet was suitably converted to amber colored glass by the following method: First, about 2 lbs. of mixed colored cullet comprising about 56% by weight flint (colorless), 22.5% by weight amber, and 21.5% by weight green glass had about 0.3 to 0.45% of $Fe_2O_3$ equivalent by weight (based on the weight of the molten cullet) of iron pyrite added thereto and intimately mixed together therewith. From about 0.015 to 0.07% by weight carbon (in the form of carbocite) was also added to the mixed colored cullet to achieve a redox number of approximately −55. These ingredients were melted to a molten state in a glass furnace at a temperature of about 2,600° F. to 2,700° F. The addition of carbon (reducing agent) controls the final amber color, i.e., as carbon content increases, the reddish-brown hue increases. The molten mixed color cullet with colorizing agents was then cooled and formed into patty samples by pouring the molten cullet from crucibles. The resultant glass was amber colored with UV transmittance of about 15%.

In this example, the amounts of each raw material was calculated manually, which is impractical since the proper control of glass color and composition for commercial production requires the simultaneous control of many variables. An automated method that provides enhanced color control and is suitable for commercial glass production is explained in the next section.

II. Automated Mixed Cullet Recycling Method

In accordance with the present invention, a software algorithm has been developed which facilitates the automatic calculation of the raw materials for different mixed cullet compositions, different percentages of mixed cullet in the glass batch, and different target glass compositions. In particular, key indicator parameters for the different glass colors have been identified and are calculated using a computer program loaded on a host processor, and these parameters are, in turn, used by the host processor to calculate the batch composition to be formed from a particular cullet starting material. The results are then printed out using convenient software, e.g. Microsoft Excel, and used in conventional commercial glass production processes.

FIG. 1 illustrates the software algorithm developed in accordance with the invention which is loaded on a host processor for calculating the composition of glass batches including post-consumer glass cullet to be recycled. The first part of the software algorithm of the invention includes the step of defining the user-selected glass parameters. In particular, at step 10, the user first selects from a list of options the raw materials to be used for the virgin component of the glass. In other words, the user specifies the type and composition of sand, limestone, aplite (feldspar), source of slag (e.g., calumite), salt cake, melite, soda ash, source of carbon (e.g., CARBOCITE™ #20) and the like to be used for the virgin glass.

At step 15, the user defines the cullet chemical composition, i.e., the oxide composition percentage of the clear, amber, and green glass in the mixed cullet to be used in the recycling process.

As shown in the sample melt of FIGS. 2(*a*) and 2(*b*) for an amber melt including 35% recycled mixed cullet, the algorithm of the invention inputs the oxide composition and cost of the raw materials (step 10) and the cullet (step 15) used in preparing the batch. The oxide percentages may be readily determined from a chemical analysis of the materials. Typical virgin glass materials may include: Glass sand from U.S. Silica; Limestone; Aplite from U.S. Silica; Calumite from Calumite Corporation; Salt Cake; Melite; Soda Ash from FMC; and Carbocite #20. Typical cullet compositions are similar to virgin glass except that they contain coloring oxides specific for clear, green, and amber. Various adjustments are also made for volatile loss during melting.

Next, at step 20, the user defines the color of the target glass desired: clear (flint), amber, or green. In the glass oxide calculation example of FIGS. 2(*a*) and 2(*b*), the specified target glass color is amber. If it is determined at step 30 that the designated color is amber, then the user should define the thickness of the transmission specimen (3.18 mm is the default) and specify the optical transmission at 550 nm ($T_{550}$) and the optical transmission at 650 nm ($T_{650}$) and/or the redness ratio, i.e., $T_{650}/T_{550}$, in the finished glass product at step 32. Typical values for 550 and 650 transmission through a 3.18 mm specimen are 11.5% and 23%, respectively. Accordingly, the default value for the redness ratio is 2.0.

However, those skilled in the art of glass making will appreciate that all amber glasses are not the same. For example, as illustrated in FIG. 3, the redness ratio and measured visible transmission levels for amber, green and clear glasses vary from producer to producer, and the program of the invention preferably accommodates this need. In FIG. 3, the transmission data is adjusted to a glass thickness of 0.125 inch, or 3.18 mm, which is the default thickness of the specimens, which include amber specimens 1–6, clear specimen 8, and green specimens 7, 9, and 10. In FIG. 3, all wavelengths are in nm.

On the other hand, if it is determined at step 30 that the specified target glass color is green, then the user should define the thickness of the transmission specimen (3.18 mm is the default) and the amount of chromium (as $Cr_2O_3$) and iron (as $Fe_2O_3$) desired in the finished glass product at step 34. Typical $Cr_2O_3$ and $Fe_2O_3$ levels for green glass are 0.23% and 0.25%, respectively. Greater levels produce a darker green and lesser levels a lighter color as desired for various beer and wine bottles. Other coloring oxides such as Mn and Ni can be added to alter the hue of the green glass.

If it is determined at step 30 that the specified target glass color is clear (flint), no additional input is required. The program identifies the amount of Fe and Cr present from the raw materials and the mandatory three-mix cullet level and, at step 36, calculates the greatest possible colorless (i.e. neutral density) transmission for a given cullet input or maximizes the amount of cullet used for a specified transmission characteristic. Blue (cobalt) and red (selenium) coloring agents may be added to give a neutral color density, i.e., nearly uniform absorption at all wavelengths. Depending on the amount of amber and green cullet used, the transmission can vary from the normal 70–80% typical of clear glass down to 30–40% for heavy three-mix loadings with lots of amber and green glass. Thus, some reformulated glasses will be quite gray whereas others will be quite good flint glasses when made from three mix cullet using the techniques of the invention. A further feature of the invention is the ability to maximize three-mix cullet use in a glass batch. As an alternative to the above method of batching flint glass, it is possible to specify the minimum transmission of the flint glass and to have the algorithm calculate the maximum amount of a certain three-mix cullet that will permit the specified transmission. Naturally, the calculated three-mix amount will be greater for three-mix cullets with little green and amber glass and lesser for cullets with lots of green and amber.

At step 40, the user defines the quantity (%) of cullet to be used in the melting process as a percentage of the total glass, e.g., 35, 50, 75%, where the remaining material is the typical virgin glass. Typically, the total quantity of three-mix cullet is between 35% and 75% but may vary based on legislative and other requirements. In the example of FIGS. 2(a) and 2(b), the percentage of cullet used in the melting process is designated as 35%.

At step 50, the cullet three mix ratios are specified. These values indicate the relative amount of clear, amber, and green glass in the cullet. These ratios may be measured by taking a core sample of the mixed cullet to be recycled or may be determined empirically by glass recyclers in different geographical areas. Typically, the ratio of clear (flint), amber, and green glass for recycling will vary according to customer use patterns and the products available in regional markets. Typically, as shown in FIG. 4, United States glass container production yields approximately 60% clear (flint) glass, 30% amber, and 10% green. However, three-mix cullet compositions vary enormously depending upon collection and recycling practices and also on consumer demographics and preferences. Three-mix cullet flint levels are in the range of 30–60%, amber in the range of 25–55%, and green in the range of 5–25%. More green tends to be present in those areas that import more foreign beers and consume more wine, as on the east and west coasts of the United States. For the example of FIGS. 2(a) and 2(b), the percentage fractions are specified as 48.3% clear (flint), 26.7% amber, and 25.0% green, a mix of cullet representative of that encountered on the east and west coasts of the United States.

Now that all the inputs are provided, the second part of the software algorithm of the invention is executed, namely, calculating the batch composition from the user-selected glass parameters. At step 60, the coloring oxide ratios and glass redox levels in the glass for the requested color properties of the target glass product are computed via known relationships. Since soda lime glass accounts for nearly 90% of all container glass produced, the target glass is assumed to be a standard soda lime silicate, modified with coloring oxides. For example, standard container soda lime silicate glass has the following coloring oxide percentages:

| Oxide | Weight Percent |
| --- | --- |
| $SiO_2$ | 71.5% |
| $Al_2O_3$ | 1.7% |
| CaO | 10.9% |
| MgO | 1.5% |
| $Na_2O$ | 13.5% |
| $K_2O$ | 0.1% |

Then, at step 70, the values of key indicator parameters in the target glass are calculated based on the user defined inputs in steps 10–50. Key indicator parameters are glass batch composition and redox parameters that affect the color or the glass in a sensitive way. For example, small amounts of Cr and/or Fe will make a glass with color ranging from green to blue. The engineering and control of the color of the melted glass requires close control of these parameters and a detailed knowledge of the way in which these oxides influence the color of the melted glass. The key indicator parameters are different for the three glass colors considered herein (amber, green, and clear) and will thus be discussed separately.

Amber Glass

For amber glass, the key indicator parameters are: iron [Fe], Sulfur [S], chrome [Cr], and copper [Cu], or other red coloring agent concentrations, and the oxidation state of the amber glass as expressed by the batch redox number or chemical oxygen demand (COD) of the glass. As known by those skilled in the art and as described previously, the redox number (RN) is a value used in commercial glass melting to express the redox balance between sodium sulfate (salt cake, the oxidizer) and carbon or carbon equivalents (reducing agents). Normal redox numbers are in the range of +10 to −30 for flint and green glass and −50 to −80 for amber glass.

Chemical oxygen demand (COD), is a measure of the chemical reducing power of batch constituents. COD is a way of measuring the redox level of raw materials and glass using conventional methods available from analytical laboratories. COD is expressed as percent of carbon and represents, in effect, the chemical reducing power of the raw material in terms of equivalent levels of carbon. For example, a certain carbon additive to a glass batch may contain 78% carbon and 22% ash. Such a material would have a COD of 78% since it has the equivalent of 78% carbon. As a second example, a slag raw material may contain a mixture of reduced chemical species such as sulfide and various carbides such that its reducing power is equivalent to 1% free carbon, even though the slag may contain no free carbon. This raw material will have a COD of 1%. Hence, the COD factor, when summed over all glass batch raw materials, quantitatively identifies the reducing power of the batch in terms of equivalent carbon levels. So, if a glass batch has a collective COD of 0.2%, or 2000 ppm, then the amount of oxygen it will take up can be calculated as follows for each 100 grams of glass:

100 grams×2000×10⁶=0.2 carbon equivalent.

Thus, 0.2 g C "demands" 32/12*0.2=0.533 g $O_2$.

Those skilled in the art will appreciate that more reduced batch chemistries and higher Fe, Cr, and S levels produce darker amber glasses and that the redness ratio is increased with higher levels of S and Cu. The necessary levels of the key indicators are calculated from optical extinction coefficients for each constituent, where the extinction coefficient is defined as follows:

$$I = I_o R_f e^{-ext \cdot L}$$

where I is the transmitted intensity, $I_o$ is the incident intensity, $R_f$ is Fresnel reflection from the interfaces, ext is the extinction coefficient, and L is the thickness of the test specimen in mm. For example, $Cr_2O_3$ has an extinction coefficient at 550 nm of 0.484 for each weight percent in the glass. Thus, a glass containing 0.2% $Cr_2O_3$ will have an extinction coefficient attributable to $Cr_2O_3$ of 0.484*0.2= 0.097. At 650 nm, the $Cr_2O_3$ extinction coefficient per percent oxide is 2.174. The other parameters are treated similarly, using values obtained from the literature and/or from spectrophotometric measurement.

FIG. 5 illustrates the extinction coefficients (ext) for the 10 container glass specimens of FIG. 3 as calculated using the above equation for the different wavelengths (in nm). FIG. 5 also illustrates the average extinction coefficients and average transmission normalized through 3.18 mm thick glass for the major amber and green glass manufacturers in the United States, where BMC is Budweiser, Miller, and Coors (for amber), and BH is Becks and Heineken (for green). Thus, the values used will depend on the container glass desired.

Green Glass

For green glass, the key indicators are $Cr_2O_3$ and $Fe_2O_3$ concentrations. Green glass is treated similarly to amber glass except that color matching is done directly on an oxide basis. That is, no input regarding transmission data is accepted, but rather the user simply defines the $Cr_2O_3$ and $Fe_2O_3$ levels desired in the finished glass. Typical $Cr_2O_3$ and $Fe_2O_3$ levels for green glass are 0.23% and 0.25%, respectively. More $Cr_2O_3$ increases the green intensity and more $Fe_2O_3$ increases the green and blue intensity, depending on oxidation level. More oxidizing $Fe_2O_3$ glasses are greenish yellow as compared to the bluish color of reduced $Fe_2O_3$ glass.

Clear Glass

As will be appreciated by those skilled in the art, the clear glass model seeks to minimize the effect of the color oxides introduced from the green and amber cullet. It is not possible to "bleach" the glass or remove the coloring oxides; it is only possible to minimize their impact. This is done by minimizing (using linear programming) the amount of coloring oxides entering the glass from the virgin batch component, oxidizing the existing iron to the ferric state, and complementing the coloring effects of Fe and Cr (greenish) with Co (blue) and Se (red) to give a neutral density absorption, i.e., a "colorless" glass. Thus, the key indicators for clear (flint) glass are $Cr_2O_3$, $Fe_2O_3$, selenium and cobalt concentrations, and the redox number (oxidation state of the glass).

The clear glass model operates independently of user input, aside from the cullet and batch parameters, and computes all values internally to give the colorless glass with the highest transmission possible. Two modes of operation are provided: transmission optimization for a given three-mix cullet composition and level, and cullet optimization for a given transmission specification. Given a certain cullet mix ratio and quantity to be used in the glass, and given the raw materials from which virgin glass can be prepared, the minimum coloring oxide concentration is defined. The program of the invention seeks to calculate the composition which supplements the defined cullet levels so that the melted glass has minimum levels of the coloring oxides for iron [$Fe_2O_3$] and chrome [$Cr_2O_3$]. Given these levels, the program then adds sufficient decolorizing oxides such as cobalt (e.g., 2 ppm Co per 100 ppm ($Fe_2O_3+Cr_2O_3$)) and selenium (e.g., 30 ppm Se per 100 ppm ($Fe_2O_3+Cr_2O_3$)) to produce a neutral color, uniform spectral absorption (i.e., wavelength independent transmission) across the visible wavelength range, whereby the glass is oxidized to a redox number in the range of +5 to +10 so that the ferrous [$Fe^{+2}$] ions are converted to ferric [$Fe^{+3}$] to minimize the coloring effect of the iron. Depending on the amount of amber and green cullet used, the transmission can vary from the normal 70–80% typical of clear glass down to 30–40% for heavy three-mix loadings with lots of amber and green glass. Thus, some reformulated glasses will be somewhat gray whereas others will be quite good flint glasses. In a similar fashion, the model can be used to define the maximum amount of a certain three-mix cullet that can be used in manufacturing a flint glass with fixed transmission specifications.

Computational Algorithm—Linear Programming

Once the key indicator parameters are defined at step 70, the batch formula (composition) can be calculated using linear programming methods at step 80. In particular, the proper amounts of raw materials, including the specified cullet fraction and mix, are computed so that the proper coloring oxides, redox agents, and remaining glass structural oxides are present in the proper proportion. The linear problem is as follows:

$$M_{m \times n} X_n = B_m$$

where:

M is a matrix of dimension m by n, where n is the number of raw materials, including cullet, from which the batch can be calculated and m is the number of composition constraints which include all the key indicators plus essential oxide concentrations for the base glass. In a typical amber composition, for example, there might be 12 raw materials [n=12] consisting of three different cullets [clear, amber, and green] plus nine conventional glass raw materials such as sand, limestone, soda ash, etc. The constraints may consist of $SiO_2$, $Al_2O_3$, CaO, $Na_2O$ concentrations from the base glass composition, plus the coloring oxides of iron, sulfur, and copper concentrations, plus the redox number (RN) value, and finally a constraint that requires everything to add up to 100%. This totals nine constraints. Thus, matrix M is a 9×12 matrix in this case. Although most of these calculations are performed internally in the program, the values of most of these constraints as well as other variables are given on the bottom two rows of FIG. 2B.

X is a row vector of dimension n that defines the weight percent of each raw material in the glass batch. This variable, when solved, yields the batch composition.

B is a column vector of dimension m that contains the target values of the constraints. These constraints are the target properties of the glass in terms of oxide and key indicator values as discussed above.

The solution to the problem is conducted in a straightforward manner using matrix algebra:

$$X_n = B_m / M_{m \times n}$$

As just noted, the batch calculation procedure of the invention utilizes linear programming to calculate batch compositions from the available raw materials and the defined requirements of the melted glass. Those skilled in the art of linear programming will appreciate that linear programming techniques solve simultaneous linear equations. As a result, in practically all real batch calculation cases, there is not a unique solution but rather many solutions, arising from the fact that many raw materials contain common oxides. For example, sand, feldspar, slag, and cullet all contain $SiO_2$. This multiplicity of solutions provide a "slackness" in the model. Accordingly, the technique of the invention includes an algorithm at step 90 for selecting from among these numerous solutions. The presently preferred means for performing the selection is called the objective function, which is an additional function which is solved to give a minimum, maximum, or target value. Most typical is for the objective function to be a simple linear cost model in which the total batch cost is the sum of the cost of each raw material multiplied by the fraction of the raw material in the glass batch. Thus, the slackness in the solution is used in amber and green glasses to calculate at step 90 a batch formula selecting raw materials that minimize the total batch cost. In flint (clear) glass compositions, on the other hand, the slackness is used to minimize the iron content in the batch. That is, the computer program of the invention selects from the multiple solutions the one that uses the least expensive raw materials (for amber and green glasses) or containing a minimum of iron (for flint glass).

At step 100, once the linear problem is solved, results are printed which give the batch composition from raw material quantities both in terms of 2000 lbs. glass and as weight percentages, the chemical composition of the glass, and, for amber glass, the estimated transmission properties. These values can then be used quite usefully in the production of the glass by those skilled in the glass-making art and the final step, step 110, is to transfer these data to the glass manufacturing operation, either manually or by computerized control to the batch weigh-out computer. For example, the raw material amounts for a 2000 pound glass batch of amber glass with the properties specified in FIG. 2(*a*) are illustrated in FIG. 2(*b*) and in the more comprehensive output shown in FIG. 2(*c*). Suitable spreadsheet programs and printing programs such as Microsoft Excel may be used for this purpose.

The glass articles are then produced from the raw materials so designated in a conventional fashion whereby the raw materials are converted at high temperatures to a homogeneous melt that is then formed into the articles. In particular, the molten glass is either molded, drawn, rolled, or quenched, depending on the desired shape and use. For example, bottles, dishes, optical lenses, television picture tubes, and the like are formed by blowing, pressing, casting, and/or spinning the molten glass against a mold to cool and to set in its final shape. On the other hand, window glass, tubing, rods, and fibers are formed by freely drawing the glass in air (or across a bath of molten tin as in the float process) until the molten glass sets up and can be cut to length. Of course, other glass products such as art glass, frit, and glass laminates may also be created using conventional techniques from recycled glass using the techniques described herein.

In summary, the computerized method of the invention includes a computer program loaded into the associated memory of a host processor for providing program instructions to the host processor to perform the steps of:

1. inputting a raw material array (M) for n materials (sand, soda ash, limestone, etc.) with m properties ($SiO_2$, $Al_2O_3$, etc.), including three mix cullet oxide composition;

2. defining the glass type for melting: clear, amber, or green;
3. determining how much cullet (by weight percent) is to be melted as a fraction of the finished glass;
4. determining the three-mix cullet composition (input percentage of clear, amber, and green in cullet);
5. specifying transmission properties of amber glass (550 nm and 650 nm transmission percentages are required to determine level of coloring oxides used in glass) or green glass (levels of Cr and Fe must be specified) or determine the best glass possible for a given cullet level for clear (flint) glass;
6. calculating glass coloring agent levels from specified transmission properties using known relationships between oxide percentages and extinction coefficients;
7. once the coloring agents are computed, storing the composition of the glass in a row vector of length m, where each element corresponds to the necessary level of $SiO_2$, $Al_2O_3$, etc., in the target glass;
8. solving the linear problem MX=B by inverting matrix M (using any of the accepted methods in numerical analysis, such as Gauss-Jordan elimination, or Newton-Raphson iteration methods) and multiplying by target vector B;
9. using slackness generated by multiple solutions to minimize cost in amber and green glasses calculation and to minimize iron levels in clear glass; and
10. printing batch composition, oxide composition, and selected transmission parameters for each glass.

Results of Laboratory Melts for Recycled Amber, Green, and Flint Glasses

1. Amber

To demonstrate the ability of the amber model to produce amber glass of good redness ratio from a three-mix cullet, a sample of three-mix cullet typical of the East and West coasts of the United States containing 48.3% flint glass, 26.7% amber glass, and 25% green glass was used as 35% of the total amber batch, as in the example of FIGS. 2(*a*) and 2(*b*). The target amber transmission was 11.5% at 550 nanometers and 23% at 650 nanometers for a redness ratio of 2.0. The reformulation algorithm described above calculated the following glass batch. Note the addition of CuO to promote redness of the amber to meet the desired redness ratio even with the presence of 8.75% green cullet.

| Raw Material | grams |
| --- | --- |
| Cullet, Clear | 169.05 |
| Cullet, Amber | 93.45 |
| Cullet, Green | 87.50 |
| Sand, US Silica | 427.59 |
| Limestone | 73.07 |
| Aplite, US Silica | 0.00 |
| Calumite | 89.67 |
| Salt Cake | 9.09 |
| Melite - 40 | 3.81 |
| Soda Ash, FMC | 141.27 |
| Coal, Carbocite #20 | 0.272 |
| Copper Oxide, CuO | 0.127 |
| TOTALS | |
| Cullet | 350.00 |
| Virgin Batch | 744.89 |
| Total Batch | 1094.89 |
| Glass | 1000.00 |
| Loss on Ignition (LOI) | 94.89 |

Note that this batch is for 1000 grams of glass rather than 2000 pounds of glass as in FIGS. 2(a) and 2(b). The calculated composition of this glass, on a batch basis (i.e. not including volatile losses during melting), is:

| | |
|---|---|
| $SiO_2$ | 71.25% |
| $Al_2O_3$ | 1.67% |
| CaO | 11.32% |
| MgO | 1.37% |
| Na2O | 13.52% |
| $K_2O$ | 0.10% |
| $Fe_2O_3$ | 0.20% |
| $TiO_2$ | 0.16% |
| S(total) | 0.39% |
| $Cr_2O_3$ | 0.02% |
| CuO | 0.01% |
| Total | 100.00% |
| Redox Number | −51 |

The glass was melted by Corning Laboratory Services of Corning, N.Y. according to their standard procedure. 1000 g of glass was melted for 8 hours at a maximum temperature of 1450° C. in a 1.8 liter silica crucible in an electric furnace with an ambient (oxidizing) atmosphere without any stirring or mixing. The oxidizing atmosphere of the melting environment and the eight hour residence time produces an oxidized non-amber surface of the melt, which when mixed with the amber glass during the pour, lightens the color of the glass. The resultant glass was poured to a patty, annealed and a section was cut for transmission measurements. The glass has the expected glass color: a good amber and a bit lighter than the target. Transmission results are summarized below:

| Parameter | Target Value | Measured Value |
|---|---|---|
| 550 nm transmission | 11.5 | 16.4 |
| 650 nm transmission | 23.0 | 39.9 |
| Redness Ratio | 2.0 | 2.4 |

As a second example of the ability of the invention to produce glass of good redness ratio, even when large amounts of green cullet are added, a sample of "two-mix" cullet containing 50% amber glass and 50% green glass was used as 40% of the total amber glass. The target amber transmission was 11.5% at 550 nanometers and 23% at 650 nanometers for a redness ratio of 2.0. The reformulation algorithm described above calculated the following glass batch.

| Raw Material | grams |
|---|---|
| Cullet, Clear | 0.0 |
| Cullet, Amber | 200.0 |
| Cullet, Green | 200.0 |
| Sand, US Silica | 394.94 |
| Limestone | 55.63 |
| Aplite, US Silica | 0.00 |
| Calumite | 89.47 |
| Salt Cake | 9.07 |
| Melite - 40 | 2.63 |
| Soda Ash, FMC | 129.48 |
| Coal, Carbocite #20 | 0.0298 |
| Copper Oxide, CuO | 0.3373 |

-continued

| Raw Material | grams |
|---|---|
| TOTALS | |
| Cullet | 400.00 |
| Virgin Batch | 681.58 |
| Total Batch | 1081.58 |
| Glass | 1000.00 |
| Loss on Ignition (LOI) | 94.89 |

Note that this batch is for 1000 grams of glass rather than 2000 pounds of glass as in FIGS. 2(a) and 2(b). The calculated composition of this glass, on a batch basis (i.e. not including volatile losses during melting), is:

| | |
|---|---|
| $SiO_2$ | 71.5% |
| $Al_2O_3$ | 1.7% |
| CaO | 10.9% |
| MgO | 1.37% |
| $Na_2O$ | 13.52% |
| $K_2O$ | 0.10% |
| $Fe_2O_3$ | 0.20% |
| $TiO_2$ | 0.17% |
| S(total) | 0.407% |
| $Cr_2O_3$ | 0.04% |
| CuO | 0.07% |
| Total | 100.0% |
| Redox Number | −51 |

The glass was melted by Corning Laboratory Services of Corning, N.Y. according to their standard procedure. 1000 g of glass was melted for 8 hours at a maximum temperature of 1450° C. in a 1.8 liter silica crucible in an electric furnace with an ambient (oxidizing) atmosphere without any stirring or mixing. The resultant glass was poured to a patty, annealed and a section was cut for transmission measurements. The glass has beautiful amber color with excellent redness ratio. The intensity was a bit darker than expected, a factor easily adjusted in subsequent melts. Transmission results are summarized below:

| Parameter | Target Value | Measured Value |
|---|---|---|
| 550 nm transmission | 11.5 | 6.0 |
| 650 nm transmission | 23.0 | 18.1 |
| Redness Ratio | 2.0 | 3.02 |

Of course, changing the percentages of amber, clear, and green cullet in the three-mix as well as the percentage of cullet in the total glass will lead to different glass oxide compositions to be included in the final glass batch. For example, FIGS. 6–11 illustrate the glass batch formulations for the respective three-mix batch calculation scenarios set forth in FIG. 4 for use in creating recycled amber glass containers using the techniques of the invention.

FIGS. 2(c), 6(a), and 6(b) respectively illustrate the glass batch formulations for the East/West coast three-mix where the cullet is 35%, 50%, and 75% of the total glass, respectively.

FIGS. 7(a)–7(c) respectively illustrate the glass batch formulations for three-mix approximately matching USA glass production where the cullet is 25%, 50%, and 75% of the total glass, respectively.

FIGS. 8(a)–8(c) respectively illustrate the glass batch formulations for three-mix approximately matching USA glass production but with ⅓ clear glass removed where the cullet is 25%, 50%, and 75% of the total glass, respectively.

FIGS. 9(a)–9(c) respectively illustrate the glass batch formulations for three-mix approximately matching the U.S. glass production but with ⅔ clear glass removed where the cullet is 25%, 50%, and 75% of the total glass, respectively.

FIGS. 10(a)–10(c) respectively illustrate the glass batch formulations for the trend to amber three-mix where the cullet is 25%, 50%, and 75% of the total glass, respectively.

FIGS. 11(a)–11(c) respectively illustrate the glass batch formulations for the Beer Belt Blend where the cullet is 25%, 50%, and 75% of the total glass, respectively.

2. Green

To demonstrate the ability of the green model to produce suitable green glass from a three-mix cullet, a sample of three-mix cullet typical of the East and West coasts of the United States containing 47.2% flint glass, 27.2% amber glass, and 25.5% green glass was used as 35% of the total green batch. The target composition was $Fe_2O_3 = 0.25\%$ and $Cr_2O_3 = 0.23\%$. The reformulation algorithm described above calculated the following glass batch:

| Raw Material | grams |
|---|---|
| Cullet, Clear | 165.36 |
| Cullet, Amber | 95.36 |
| Cullet, Green | 89.29 |
| Sand, US Silica | 437.92 |
| Limestone | 129.97 |
| Aplite, US Silica | 48.77 |
| Calumite | 0.00 |
| Salt Cake | 12.05 |
| Melite —40 | 0.37 |
| Soda Ash, FMC. | 134.89 |
| Coal, Carbocite #20 | 0.969 |
| Copper Oxide, CuO | 0.000 |
| Iron Chromite, $FeCr_2O_4$ | 4.520 |
| Chrome Oxide, $Cr_2O_3$ | 0.047 |
| TOTALS | |
| Cullet | 350.00 |
| Virgin Batch | 769.52 |
| Total Batch | 1119.52 |
| Glass | 1000.00 |
| Loss of Ignition (LOI) | 119.52 |

The calculated composition of this glass is:

| | |
|---|---|
| $SiO_2$ | 72.0% |
| $Al_2O_3$ | 1.67% |
| CaO | 11.3% |
| MgO | 0.25% |
| $Na_2O$ | 13.52% |
| $K_2O$ | 0.19% |
| $Fe_2O_3$ | 0.25% |
| $TiO_2$ | 0.07% |
| S(total) | 0.35% |
| $Cr_2O_3$ | 0.23% |
| Total | 100.00% |
| Redox Number | −30 |

The glass was melted by Corning Laboratory Services of Corning, N.Y. according to their standard procedure. 1000 g of glass was melted for 8 hours at a maximum temperature of 1450° C. in a 1.8 liter silica crucible in an electric furnace with an ambient (oxidizing) atmosphere without any stirring or mixing. The resultant glass was poured to a patty, annealed and a section was cut for transmission measurements. The glass was a beautiful green color, as expected. Transmission results are summarized below:

| Parameter | Measured Value |
|---|---|
| 450 nm transmission | 14.9 |
| 550 nm transmission | 66.6 |
| 650 nm transmission | 32.6 |

As in the amber example, changing the percentages of amber, clear, and green cullet in the three-mix as well as the percentage of cullet in the total glass will lead to different glass oxide compositions to be included in the final glass batch. For example, FIGS. 12–14 illustrate the glass batch formulations for three of the respective three-mix batch calculation scenarios set forth in FIG. 4 for use in creating recycled green glass containers using the techniques of the invention.

FIGS. 12(a) and 12(b) together illustrate a spreadsheet of a glass oxide calculation model from the batch formula for the creation of recycled green glass containers including East/West Coast three-mix cullet using the techniques of the invention.

FIGS. 12(c) and 12(d) respectively illustrate the glass batch formulations for the East/West Coast three-mix where the cullet is 35% and 70% of the total glass, respectively.

FIGS. 13(a)–13(c) respectively illustrate the glass batch formulations for three-mix approximately matching the U.S. glass production where the cullet is 25%, 50%, and 75% of the total glass, respectively.

FIGS. 14(a)–14(c) respectively illustrate the glass batch formulations for the Beer Belt Blend three-mix where the cullet is 25%, 50%, and 75% of the total glass, respectively.

3. Flint (Clear)

To demonstrate the ability of the flint model to produce clear glass with colorless absorption of a minimum level from a batch containing three-mix cullet, a sample of Beer Belt Blend three-mix cullet containing 55% flint glass, 40% amber glass, and 5% green glass was used as 25% of the total flint batch. The goal of the batch computation was to minimize $Fe_2O_3$, oxidize the glass to produce the lightest color possible, and to complement the color of the Fe and Cr with Se and Co to produce colorless absorption with maximum transmission.

The reformulation algorithm described above calculated the following glass batch:

| Raw Material | grams |
|---|---|
| Cullet, Clear | 137.5 |
| Cullet, Amber | 100.0 |
| Cullet, Green | 12.5 |
| Sand, US Silica | 505.0 |
| Limestone | 143.7 |
| Aplite, US Silica | 54.24 |
| Salt Cake | 6.28 |
| Soda Ash, FMC. | 154.48 |
| Ferro Cobalt Frit, 2% Co | 0.4869 |
| Ferro Selenium Frit, 5% Se | 15.2087 |
| Niter, NaNO3 | 1.5625 |
| TOTALS | |
| Cullet | 250.00 |
| Virgin Batch | 863.72 |
| Total Batch | 1113.72 |
| Glass | 1000.00 |
| Loss of Ignition (LOI) | 113.72 |

The calculated composition of this glass is:

| | |
|---|---|
| $SiO_2$ | 72.6% |
| $Al_2O_3$ | 1.72% |
| CaO | 11.0% |
| MgO | 0.32% |
| $Na_2O$ | 13.9% |
| $K_2O$ | 0.20% |
| $Fe_2O_3$ | 0.084% |
| $TiO_2$ | 0.06% |
| S(total) | 0.20% |
| Cr203 | 0.002% |
| Se | 0.0304% |
| Co | 0.0024% |
| Total | 100.00% |
| COD | 10 |

The glass was melted by Corning Laboratory Services of Corning, N.Y. according to their standard procedure. 1000 g of glass was melted for 8 hours at a maximum temperature of 1450° C. in a 1.8 liter silica crucible in an electric furnace with an ambient (oxidizing) atmosphere without any stirring or mixing. The resultant glass was poured to a patty, annealed and a section was cut for transmission measurements. Transmission measurements were made by Corning Laboratory Services of Corning, N.Y. according to their standard procedure. The glass was clear flint color with a neutral absorption, as expected, with transmission behavior, a bit lighter than expected, as summarized below:

| Parameter | Measured Value |
|---|---|
| 450 nm transmission | 80.87 |
| 550 nm transmission | 81.38 |
| 650 nm transmission | 79.33 |

As in the amber and green examples, changing the percentages of amber, clear, and green cullet in the three-mix as well as the percentage of cullet in the total glass will lead to different glass oxide compositions to be included in the final glass batch. For example, FIGS. 15 and 16 illustrate the glass batch formulations for two of the respective three-mix batch calculation scenarios set forth in FIG. 4 for use in creating recycled clear (flint) glass containers using the techniques of the invention.

FIGS. 15(a) and 15(b) together illustrate a spreadsheet of a glass oxide calculation model from the batch formula for the creation of recycled clear (flint) glass containers from the Beer Belt Blend three-mix, where the cullet is 25% of the total glass, using the techniques of the invention.

FIGS. 15(c) and 15(d) illustrate the glass batch formulations for the creation of recycled clear (flint) glass containers from the Beer Belt Blend three-mix where the cullet is 25% and 50% of the total glass.

FIGS. 16(a) and 16(b) respectively illustrate the glass batch formulations for the creation of recycled clear (flint) glass containers from the USA production three-mix where the cullet is 25% and 50% of the total glass, respectively.

The invention having been disclosed in connection with the foregoing variations and examples, additional variations will now be apparent to persons skilled in the art. The invention is not intended to be limited to the variations and examples specifically mentioned, and accordingly reference should be made to the appended claims to assess the spirit and scope of the invention in which exclusive rights are claimed.

For example, those skilled in the art will appreciate that the techniques of the invention may be used for a variety of different virgin glass raw materials, a variety of three-mix ratios from very small percentages (<10%) to 100% mixed color cullet with respect to the total glass in the glass batch, a variety of color combinations in the three-mix itself, and a variety of input oxides. Also, the recycled glass container end products may have any of numerous desired transmission characteristics. In a preferred implementation, the technique of the invention is used to create recycled beer bottles from three-mix cullet. Conventional amber beer bottles typically have a 550 nm transmission of 8–20% and a redness ratio of 1.2–3.0. One of the most prevalent types of beer bottles in circulation in the United States is the amber beer bottle used by Anheuser-Busch which has the following characteristics: 550 nm transmission of 12–15% through a 3.18 mm specimen, with a redness ratio of approximately 1.8 to 2.0, depending on the level of 550 transmission. The technique of the invention may be advantageously used to create amber beer bottles with these characteristics from glass batches with varying percentages of mixed color cullet.

Those skilled in the art will appreciate that although amber beer bottles made from mixed color cullet using the techniques of the invention will have the desired transmission characteristics, they can be distinguished from conventional amber beer bottles based on the chromium ($Cr_2O_3$) content. In particular, those skilled in the art will appreciate that amber and clear bottles made from mixed color cullet including measurable amounts of green cullet will have chromium levels well above the trace chromium contamination levels which would ordinarily be expected from the use of chrome-containing refractories in glass furnaces or from other sources of chromium contamination. Since chromium is relatively expensive, it is not likely to be introduced into the glass in measurable quantities from other sources. In accordance with the invention, amber bottles made from mixed color cullet including green glass may have a chromium weight percent in a wide range of 0.01% to 0.3%, although narrower ranges such as 0.015% to 0.15% or 0.015% to 0.10% may also be measured. In the samples given above, the chromium range was 0.02% to 0.04%. Of course, the weight percentages for chromium will vary as the amount of green cullet in the mixed color cullet varies.

All such variations are intended to be included in the following claims.

I claim:

1. A method of creating recycled glass products of a particular color from raw materials including mixed color glass cullet, said mixed color glass cullet including at least two of green glass, amber glass, and flint glass, comprising the steps of:

specifying the oxide composition percentage of said at least two of said green, amber, and flint glass in said mixed color glass cullet;

specifying the particular color and transmission properties of the recycled glass products;

specifying a quantity of said mixed color glass cullet to be melted as a fraction of total glass in a batch from which said recycled glass products are to be created;

specifying a percentage composition of each of said at least two of said amber, green, and flint glass in said mixed color glass cullet;

calculating using said percentage composition the desired glass coloring oxide agent levels of glass of said particular color with said specified transmission properties;

calculating a batch composition of said recycled finished glass, said batch composition including said mixed color glass cullet and amounts of said glass coloring oxide agents suitable to adjust final glass coloring oxide agent levels to said desired glass coloring oxide agent levels for glass of said particular color with said specified transmission properties; and creating recycled glass products from said calculated batch composition.

2. A method as in claim 1, wherein said step of specifying percentage composition of said mixed color glass cullet comprises the step of measuring the composition of a sample of said mixed color glass cullet.

3. A method as in claim 1, wherein said particular color is amber, and said step of specifying transmission properties of said recycled glass products comprises the steps of specifying a thickness of a finished glass product made from said calculated composition and specifying at least two of: an optical transmission of said finished glass product at 550 nm ($T_{550}$), an optical transmission of said finished glass product at 650 nm ($T_{650}$), and a redness ratio ($T_{650}/T_{550}$) of said finished glass product.

4. A method as in claim 3, wherein said step of calculating desired glass coloring oxide agent levels further comprises the step of calculating key glass indicator parameters selected from a group comprising iron concentration, sulfur concentration, chrome concentration, copper concentration, and oxidation state.

5. A method as in claim 1, wherein said particular color is green, and said step of specifying transmission properties of said recycled glass products comprises the steps of specifying a thickness of a finished glass product made from said calculated composition and specifying levels of chromium and iron of said finished glass product.

6. A method as in claim 5, wherein said step of calculating desired glass coloring oxide agent levels further comprises the step of calculating key glass indicator parameters selected from a group comprising chromium concentration and iron concentration.

7. A method as in claim 1, wherein said particular color is flint, and said step of specifying transmission properties of said recycled glass products comprises the step of determining the best possible neutral density transmission for a finished glass product for the specified amount of mixed color glass cullet in said finished glass product.

8. A method as in claim 7, wherein said step of calculating desired glass coloring oxide agent levels further comprises the step of calculating key glass indicator parameters selected from a group comprising chromium concentration, iron oxide concentration, selenium concentration, cobalt concentration, and oxidation state.

9. A method as in claim 1, wherein said particular color is flint, and said step of specifying transmission properties of said recycled glass products comprises the step of maximizing the amount of mixed color glass cullet used in said finished glass product for the transmission properties specified in said transmission properties specifying step.

10. A method as in claim 9, wherein said step of calculating desired glass coloring oxide agent levels further comprises the step of calculating key glass indicator parameters selected from a group comprising chromium concentration, iron oxide concentration, selenium concentration, cobalt concentration, and oxidation state.

11. A method as in claim 1, wherein said step of calculating the composition of said recycled finished glass comprises the step of calculating the the proper amounts of the raw materials so that the proper coloring oxides, redox agents, and glass structural oxides are present in the proper proportion in the finished glass products in accordance with the following linear equation:

$$M_{m \times n} X_n = B_m$$

where:

M is a matrix of dimension m by n, where n is a number of said raw materials from which said recycled finished glass is to be made and m is a number of composition constraints including said key glass indicator parameters plus essential oxide concentrations for said finished glass products;

X is a row vector of dimension n that defines the weight percent of each component in said recycled finished glass; and B is a column vector of dimension m that contains target values of said composition constraints.

12. A method as in claim 11, wherein said particular color is amber, said components include compositions of clear, amber, and green cullets plus a predetermined number of conventional glass raw materials, and said composition constraints include concentrations of $SiO_2$, $Al_2O_3$, CaO, and $Na_2O$ from the conventional glass raw materials, the concentrations of the coloring oxides of chrome, iron, sulfur, and copper, and a chemical oxygen demand value.

13. A method as in claim 11, wherein said step of calculating the composition of said recycled finished glass comprises the additional step of selecting solutions of said linear equation which minimize costs of said components in said recycled finished glass.

14. A method as in claim 11, wherein said step of calculating the composition of said recycled finished glass comprises the additional step of selecting solutions of said linear equation which minimize iron levels in said recycled finished glass.

15. A method as in claim 1, comprising the additional step of printing said composition by weight percentages of said recycled finished glass for a predetermined amount of said finished glass products and a chemical composition of said recycled finished glass.

16. A method as in claim 15, comprising the additional step of printing estimated transmission properties of said finished glass products.

17. A glass bottle including recycled mixed color cullet wherein said bottle is made in accordance with the process of claim 1.

* * * * *